(12) United States Patent
Nishikawa

(10) Patent No.: US 7,659,716 B2
(45) Date of Patent: Feb. 9, 2010

(54) SENSOR CIRCUIT, SEMICONDUCTOR DEVICE, AND ELECTRONIC APPARATUS

(75) Inventor: Hidetoshi Nishikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 175 days.

(21) Appl. No.: 11/828,199

(22) Filed: Jul. 25, 2007

(65) Prior Publication Data

US 2008/0048772 A1    Feb. 28, 2008

(30) Foreign Application Priority Data

Jul. 26, 2006   (JP)   .............................. 2006-203304

(51) Int. Cl.
*G01R 33/02* (2006.01)
*G01R 33/06* (2006.01)
*H03K 3/45* (2006.01)
*H03K 17/80* (2006.01)

(52) U.S. Cl. ....................... 324/244; 324/251; 324/252; 324/415; 324/416; 327/510; 327/511

(58) Field of Classification Search .................... 700/1, 700/12–14, 306; 324/244, 252, 415–416, 324/251; 361/235; 327/510, 511; 257/427
See application file for complete search history.

(56) References Cited

U.S. PATENT DOCUMENTS

| | | | | |
|---|---|---|---|---|
| 4,835,716 | A | * | 5/1989 | Tamaki et al. .................. 702/50 |
| 5,202,675 | A | * | 4/1993 | Tokimoto et al. ............. 345/31 |
| 5,790,234 | A | * | 8/1998 | Matsuyama .................. 351/212 |
| 5,861,806 | A | * | 1/1999 | Vories et al. ................. 340/555 |
| 6,157,171 | A |   | 12/2000 | Smith |
| 6,794,863 | B2 | * | 9/2004 | Hatanaka ..................... 324/251 |
| 2004/0130317 | A1 | * | 7/2004 | Hatanaka ................. 324/207.2 |
| 2006/0148540 | A1 |   | 7/2006 | Satoh et al. |
| 2006/0277995 | A1 | * | 12/2006 | Kutsuna .................. 73/504.02 |
| 2008/0030191 | A1 |   | 2/2008 | Nishikawa |
| 2008/0048772 | A1 |   | 2/2008 | Nishikawa |
| 2008/0265880 | A1 | * | 10/2008 | Nishikawa .................. 324/251 |

FOREIGN PATENT DOCUMENTS

| | | |
|---|---|---|
| JP | 63-079386 | 4/1988 |
| JP | 03-267781 | 11/1991 |
| JP | 04-271513 | 9/1992 |
| JP | 08-194040 | 7/1996 |
| JP | 08-201491 | 8/1996 |
| JP | 10-170533 | 6/1998 |

(Continued)

OTHER PUBLICATIONS

Office action (dated Jul. 6, 2009) in U.S. Appl. No. 11/815,696.

*Primary Examiner*—Ramesh B Patel
(74) *Attorney, Agent, or Firm*—Fish & Richardson P.C.

(57) ABSTRACT

A sensor circuit has: a sensor portion that obtains, as an electrical signal, information on an object to be measured or detected; and a control circuit that controls the operation of the sensor portion. The control circuit receives a start input signal inputted thereto from outside for making the sensor portion operate only for a given duration after the start input signal is inputted thereto. With this configuration, it is possible to reduce the current consumption by arbitrarily controlling a period of an intermittent operation of the sensor circuit.

4 Claims, 21 Drawing Sheets

FOREIGN PATENT DOCUMENTS

| | | |
|---|---|---|
| JP | 11-131879 | 5/1999 |
| JP | 2000-030765 | 1/2000 |
| JP | 2001-337147 | 12/2001 |
| JP | 2004-020289 | 1/2004 |
| JP | 2004-037221 | 2/2004 |
| JP | 2004-180286 | 6/2004 |
| WO | WO 2006/085503 | 8/2006 |

* cited by examiner

US 7,659,716 B2

SENSOR CIRCUIT, SEMICONDUCTOR DEVICE, AND ELECTRONIC APPARATUS

This application is based on Japanese Patent Application No. 2006-203304 filed on Jul. 26, 2006, the contents of which are hereby incorporated by reference.

BACKGROUND OF THE INVENTION

1. Field of the Invention

The present invention relates to sensor circuits (sensor circuits in general, such as magnetic sensors, temperature sensors, and optical sensors), to semiconductor devices built with such sensor circuits integrated thereinto, and to electronic apparatuses provided with such sensor circuits (for example, portable terminals using battery power supplies). More particularly, the present invention relates to a technology for reducing the electric power consumption of such sensor circuits.

2. Description of Related Art

In general, a magnetic sensor circuit is composed of a Hall device that outputs an output voltage commensurate with the strength of a magnetic field, an amplifier that amplifies the output voltage of the Hall device, and a comparator that compares the output voltage of the amplifier with a predetermined reference voltage and outputs the comparison result thus obtained, and is so configured as to output a binary signal (high (H) level or low (L) level) depending on whether the magnetic field in the place where the magnetic field sensor is placed is stronger or weaker than a given level.

To obtain an accurate comparison result commensurate with the magnetic field strength, it is necessary to reduce an offset signal component in the signal outputted from the amplifier and thereby reduce variation in the signal outputted from the amplifier. The offset signal component is mainly caused by an offset signal component (hereinafter a "device offset voltage") in the output voltage of the Hall device, and an offset signal component (hereinafter an "input offset voltage") at the input terminal of the amplifier. The device offset voltage is caused primarily by, for example, stress applied to a main body of the Hall device by the package, and the input offset voltage is caused primarily by, for example, variation in characteristics among elements constituting an input circuit of the amplifier.

A magnetic field sensor for reducing the influence by those offset voltages is disclosed in Patent Document 1. That is, a Hall device used in a magnetic field sensor is in general, like a Hall device 1 shown in FIG. 21, formed in the shape of a plate that is geometrically equivalent with respect to four terminals A, C, B, and D. Here, "geometrically equivalent" means that, like the quadrangular Hall device 1 shown in FIG. 21, even when it is rotated 90 degrees (rotated in such a way that the line A-C coincides with the line B-D), the shape thereof remains unchanged from that shown in FIG. 21. For an effective signal component commensurate with the magnetic field strength, a voltage appearing between the terminals B and D when a power supply voltage is applied between the terminals A and C of the Hall device 1 described above is in phase with a voltage appearing between the terminals A and C when a power supply voltage is applied between the terminals B and D; for a device offset voltage, the former is opposite in phase to the latter.

At a first time point, a power supply voltage is applied between the terminals A and C of the Hall device 1 via the switch circuit 2, and a voltage between the terminals B and D is inputted to the voltage amplifier 3. As a result, from the voltage amplifier 3, a voltage V1 commensurate with the sum of the voltage between the terminals B and D and the input offset voltage of the voltage amplifier 3 is outputted. Also, at this first time point, the switch 5 is closed, whereby the capacitor 4 is charged to the voltage V1.

Next, at a second time point, a power supply voltage is applied between the terminals B and D of the Hall device 1 via the switch circuit 2, and a voltage between the terminals C and A is inputted to the voltage amplifier 3 in such a way that a voltage having a polarity opposite to that inputted at the first time point is inputted thereto. As a result, from the voltage amplifier 3, a voltage V2 commensurate with the sum of the voltage between the terminals C and A and the input offset voltage of the voltage amplifier 3 is outputted.

Since the influence of the input offset voltage is the same as that observed at the first time point irrespective of the polarity of the input voltage, the output voltage V2 of the voltage amplifier 3 is a voltage commensurate with the sum of the voltage between the terminals C and A, the voltage having a polarity opposite to that inputted at the first time point, and the input offset voltage.

Also, at this second time point, the switch 5 is opened, whereby the inverting output terminal 3a and the non-inverting output terminal 3b of the voltage amplifier 3 and the capacitor 4 are connected in series between the output terminals 6 and 7. At this point, the charging voltage of the capacitor 4 is kept at the output voltage V1 of the voltage amplifier 3 outputted therefrom at the first time point. A voltage V between the output terminals 6 and 7 (an output voltage of the magnetic field sensor) is obtained as the sum of the voltage V2 at the non-inverting output terminal 3b of the voltage amplifier 3 relative to the inverting output terminal 3a thereof and the voltage −V1 at the terminal 4a of the capacitor 4 relative to the terminal 4b thereof, that is, the voltage V is obtained by subtracting the voltage V1 from the voltage V2. In this way, the voltage V from which the influence of the input offset voltage is offset is obtained as an output voltage of the magnetic field sensor.

A conventionally known magnetic field sensor that can reduce the influence of the input offset voltage of the amplifier as well as the influence of the device offset voltage is disclosed in Patent Document 2. This magnetic field sensor is composed of a Hall device, a switch circuit, a voltage-current converter/amplifier, a capacitor serving as a memory element, a switch, and a resistor.

Patent Document 1: JP-B-3315397

Patent Document 2: JP-A-H08-201491

Patent Document 3: JP-A-H11-131879

In ideal conditions, it can be expected that the magnetic field sensor disclosed in Patent Document 1 performs offset cancellation accurately; in reality, however, the capacitor 4 and the voltage amplifier 3 do not form a perfect differential configuration. Thus, there is a possibility that, for example, a delay (retardation) caused by the capacitor 4 or ripples or noise in the power supply voltage makes it impossible to adequately perform offset cancellation.

On the other hand, with respect to the magnetic field sensor disclosed in Patent Document 2, the following problem arises. This magnetic field sensor requires two voltage-current converter/amplifiers, two capacitors, and four switches. This makes it difficult to reduce the size of a circuit for reducing the influence of the input offset voltage.

Incidentally, since sensor circuits including magnetic field sensors used for detecting continuous movement such as rotation consume a significant amount of electricity during operation, it is preferable to minimize the operation thereof. In particular, in portable apparatuses driven by a battery power supply, it is necessary to reduce the electric power consumption of the sensor circuit as low as possible so as to prolong the battery life.

However, Patent Documents 1 and 2 do not disclose a technology for reducing the electric power consumption.

The applicant of the present invention once proposed a magnetic sensor circuit that can perform measurements with a high degree of accuracy in Japanese Patent Application No. 2005-230781 (claiming priority based on Japanese Patent Application No. 2005-031715). However, the magnetic sensor circuit proposed in this document does not achieve a sufficient reduction in current consumption.

SUMMARY OF THE INVENTION

In view of the conventionally experienced problems described above, an object of the present invention is to provide sensor circuits that have a simple structure composed of a minimal number of terminals and that can reduce the current consumption by arbitrarily controlling a period of an intermittent operation, to provide semiconductor devices built with such sensor circuits integrated thereinto, and to provide electronic apparatuses provided with such sensor circuits.

To achieve the above object, according to one aspect of the present invention, a sensor circuit is provided with: a sensor portion that obtains, as an electrical signal, information on an object to be measured or detected; and a control circuit that controls the operation of the sensor portion. Here, the control circuit receives a start input signal inputted thereto from outside for making the sensor portion operate only for a given duration after the start input signal is inputted thereto.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Hereinafter, embodiments of a magnetic sensor circuit according to the present invention will be described with reference to the accompanying drawings. Magnetic sensor circuits according to the present invention find wide application as sensors for detecting a magnetic state (magnetic field strength), such as sensors for detecting the opening/closing of a flip phone, sensors for detecting a rotation position of a motor, and sensors for detecting a turning of a dial. Magnetic sensor elements of any type may be used in such a magnetic sensor circuit as long as the electric characteristic thereof is changed according to a change in a magnetic field applied thereto, such that an output voltage commensurate with that change is outputted therefrom. Some examples of such a magnetic sensor element are magnetoelectric conversion elements such as Hall devices and magnetoresistive elements. The embodiments described below deal with a magnetic sensor circuit using a Hall device.

First Embodiment

Figure 1:
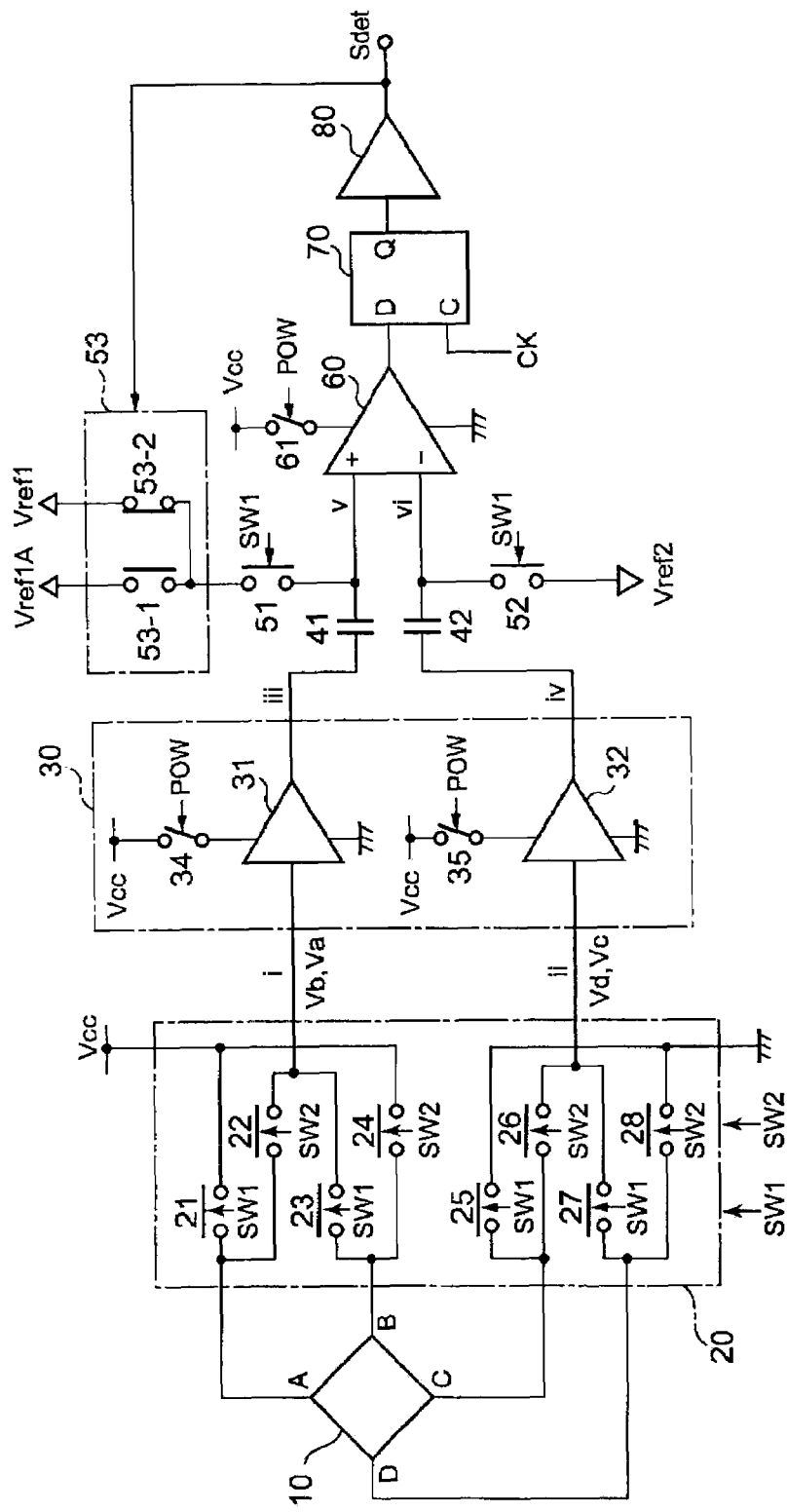
FIG. 1 is a diagram showing the configuration of a magnetic sensor circuit according to a first embodiment of the invention.
Figure 21:
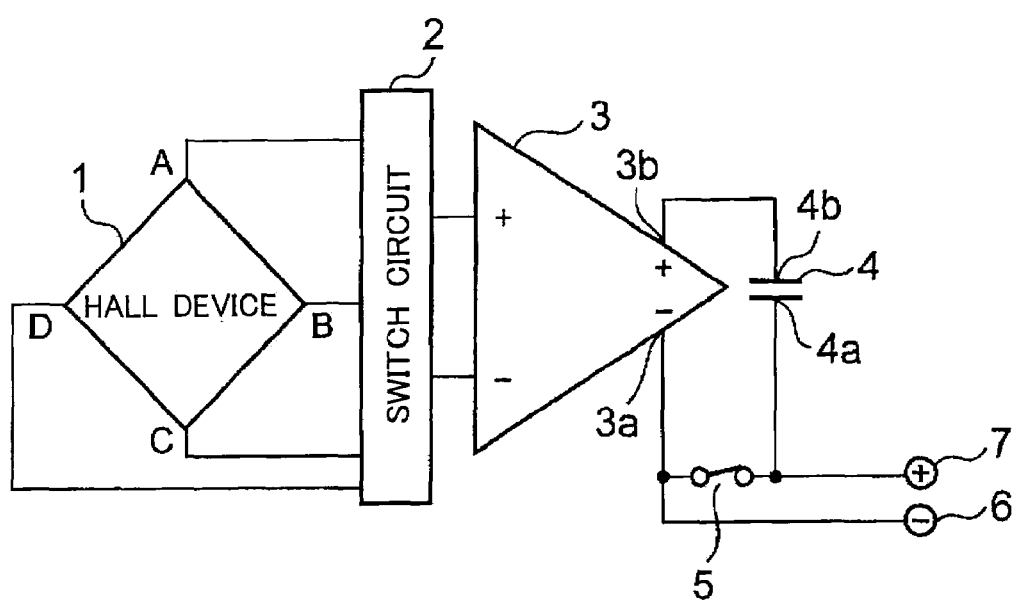
FIG. 21 is a diagram showing the configuration of a conventional magnetic field sensor.

FIG. 1 is a diagram showing the configuration of a magnetic sensor circuit according to a first embodiment of the invention. This magnetic sensor circuit is disclosed in Japanese Patent Application No. 2005-230781 (claiming priority based on Japanese Patent Application No. 2005-031715), which the applicant of the present invention once filed. In FIG. 1, as is the case with a conventional Hall device shown in FIG. 21, a Hall device 10 is formed in the shape of a plate that is geometrically equivalent with respect to four terminals A, C, B, and D.

For an effective signal component commensurate with the strength of a magnetic field applied to the Hall device 10, a Hall voltage appearing between a second terminal pair B-D when a power supply voltage Vcc is applied between a first terminal pair A-C of the Hall device 10 is in phase with a Hall voltage appearing between the first terminal pair C-A when the power supply voltage Vcc is applied between the second terminal pair B-D; for a device offset component (a device offset voltage), the former is opposite in phase to the latter.

A switching circuit 20 changes how to apply the power supply voltage Vcc to the Hall device 10 and how to extract a Hall voltage from the Hall device 10.

More specifically, the switching circuit 20 includes switches 21, 23, 25, and 27 that are turned on according to a first switching signal SW1, and switches 22, 24, 26, and 28 that are turned on according to a second switching signal SW2. The first and second switching signals SW1 and SW2 are generated in such a way that they are not superimposed on one another and that the first switching signal SW1 is generated in the first half of a predetermined duration during which a power-supply ON signal POW is generated and the second switching signal SW2 is generated in the second half of that predetermined duration. Note that the power-supply ON signal POW is generated intermittently, for example, generated only for a predetermined duration at intervals of a given period.

In a first switching state in which the first switching signal SW1 is generated, the power supply voltage Vcc is applied to the terminal A, the terminal C is connected to the ground, and a Hall voltage commensurate with the magnetic field strength appears between the terminals B and D. The voltage between the terminals B and D depends on the direction of an applied magnetic field. Here, suppose that a voltage Vb at the terminal B is lower than a voltage Vd at the terminal D. Unless otherwise noted, what is referred to as the "voltage" represents a potential relative to the ground.

Since switching from the first switching signal SW1 to the second switching signal SW2 is performed at high speed, it is assumed that the direction of the magnetic field in a second switching state is the same as that in the first switching state. In the second switching state in which the second switching signal SW2 is generated, the power supply voltage Vcc is applied to the terminal B, the terminal D is connected to the ground, and a Hall voltage commensurate with the magnetic field strength appears between the terminals C and A. For the voltage between the terminals C and A, a voltage Vc at the terminal C is lower than a voltage Va at the terminal A.

As a result, a voltage at a first output node i of the switching circuit 20 equals the voltage Vb in the first switching state, and equals the voltage Va in the second switching state. On the other hand, a voltage at a second output node ii of the switching circuit 20 equals the voltage Vd in the first switching state, and equals the voltage Vc in the second switching state.

An amplifying unit 30 makes a first amplifier circuit 31 amplify a voltage at a first amplification input node thereof connected to the first output node i by a predetermined amplification factor α, and thereby produces a first amplified voltage at a first amplification output node iii. Since an input offset voltage Voffa1 is present in the first amplifier circuit 31, the input offset voltage Voffa1 is added to the voltage at the first amplification input node.

The amplifying unit 30 makes a second amplifier circuit 32 amplify a voltage at a second amplification input node thereof connected to the second output node ii by the predetermined amplification factor α, and thereby produces a second amplified voltage at a second amplification output node iv. Since an input offset voltage Voffa2 is present in the second amplifier circuit 32, the input offset voltage Voffa2 is added to the voltage at the second amplification input node.

The power supply voltage Vcc is applied to the first and second amplifier circuits 31 and 32 of the amplifying unit 30 via switch circuits 34 and 35 that are turned on by the power-supply ON signal POW. As a result, according to the power-supply ON signal POW, the amplifying unit 30 is driven intermittently, for example, driven only for a predetermined duration at intervals of a given period. In a case where the first and second amplifier circuits 31 and 32 are driven by a current, it is preferable that the switch circuits 34 and 35 be built with a current source circuit having switching capability.

A first capacitor 41 is connected between the first amplification output node iii and a first comparison input node v of a comparing unit 60. A second capacitor 42 is connected between the second amplification output node iv and a second comparison input node vi of the comparing unit 60.

The comparing unit 60 compares a first comparison voltage inputted to the first comparison input node v with a second comparison voltage inputted to the second comparison input node vi, and produces a comparison output when the first comparison voltage is higher than the second comparison voltage. The comparing unit 60 is so configured as to have an extremely high input impedance. For example, an input circuit of the comparing unit 60 is built with a MOS transistor circuit. The power supply voltage Vcc is applied to the comparing unit 60 via a switch circuit 61 that is turned on by the power-supply ON signal POW. As a result, according to the power-supply ON signal POW, the comparing unit 60 is driven intermittently, for example, driven only for a predetermined duration at intervals of a given period. Alternatively, the switch circuit 61 may be a current source circuit having switching capability.

A first reference voltage Vref1 is fed to the first comparison input node v via a first switch circuit 51 that is turned on by the first switching signal SW1 and via a reference voltage switching circuit 53. When the magnetic sensor circuit detects the magnetism, switching of the reference voltage switching circuit 53 is performed by a detection signal Sdet of the magnetic sensor circuit. When switching of the reference voltage switching circuit 53 is performed, it becomes possible to feed an adjusted first reference voltage Vref1A to the first comparison input node v.

A second reference voltage Vref2 is fed to the second comparison input node vi via a second switch circuit 52 that is turned on by the first switching signal SW1. Preferably, the first reference voltage Vref1 is set so as to be lower than the adjusted first reference voltage Vref1A by a predetermined value, and the adjusted first reference voltage Vref1A is set so as to be lower than the second reference voltage Vref2 by a predetermined value. Alternatively, it is possible to use the second reference voltage Vref2 as the adjusted first reference voltage Vref1A.

By feeding the first reference voltage Vref1 and the second reference voltage Vref2 to the first and second comparison input nodes v and vi, respectively, when no comparison output is produced, and feeding the adjusted first reference voltage Vref1A and the second reference voltage Vref2 to the first and second comparison input nodes v and vi, respectively, when a comparison output is produced, it is possible to give hysteresis to the operation of the comparing unit 60. This ensures stable detection. Incidentally, the width of hysteresis can be easily changed by adjusting the levels of the first reference voltage Vref1, the adjusted first reference voltage Vref1A, and the second reference voltage Vref2.

A latch circuit 70 latches the comparison output with timing in coordinated with a clock signal CK. As the latch circuit 70, a D flip-flop is suitably used. A latch output of the latch circuit 70 is amplified by a buffer amplifier 80. In this way, a detection signal Sdet is generated.

Figure 2:
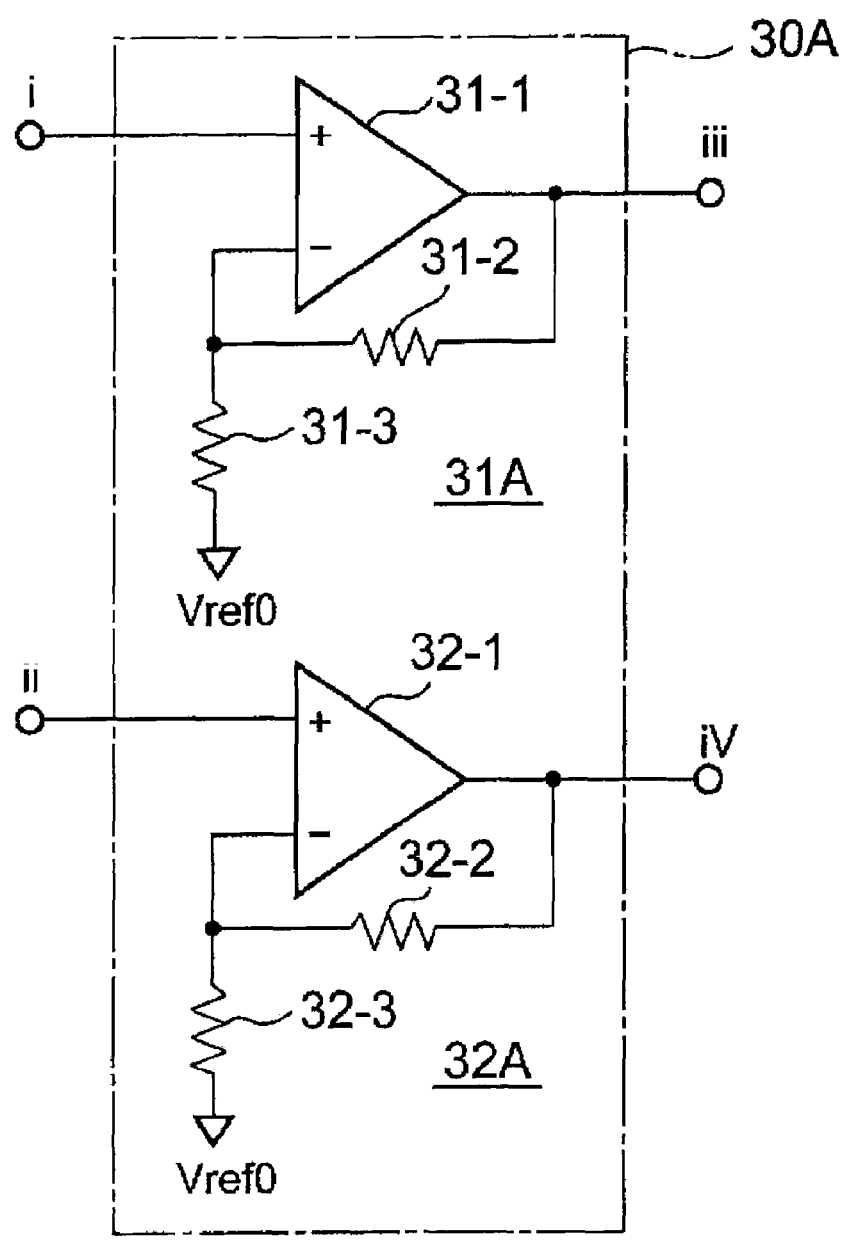
FIG. 2 is a diagram showing a first example of an amplifying unit.

FIG. 2 is a diagram showing a first example of the amplifying unit. An amplifying unit 30A shown in FIG. 2 includes a first amplifier circuit 31A and a second amplifier circuit 32A. In the first amplifier circuit 31A, a feedback resistor 31-2 is connected between the inverting input terminal of an operational amplifier 31-1 and the output node iii, and a feedback resistor 31-3 is connected between the inverting input terminal of the operational amplifier 31-1 and the reference voltage Vref0. The first amplifier circuit 31A amplifies a voltage at the first output node i inputted to the non-inverting input terminal, and outputs a first amplified voltage to the first amplification output node iii. The second amplifier circuit 32A, which has the same configuration as the first amplifier circuit 31A, amplifies a voltage at the second output node ii inputted to the non-inverting input terminal thereof, and outputs a second amplified voltage to the second amplification output node iv.

Let the resistance of the feedback resistors 31-2 and 32-2 be R2, and the resistance of the feedback resistors 31-3 and 32-3 be R1. Then, in the amplifying unit 30A shown in FIG. 2, the amplification factor α is about R2/R1, where R2>>R1.

Figure 3:
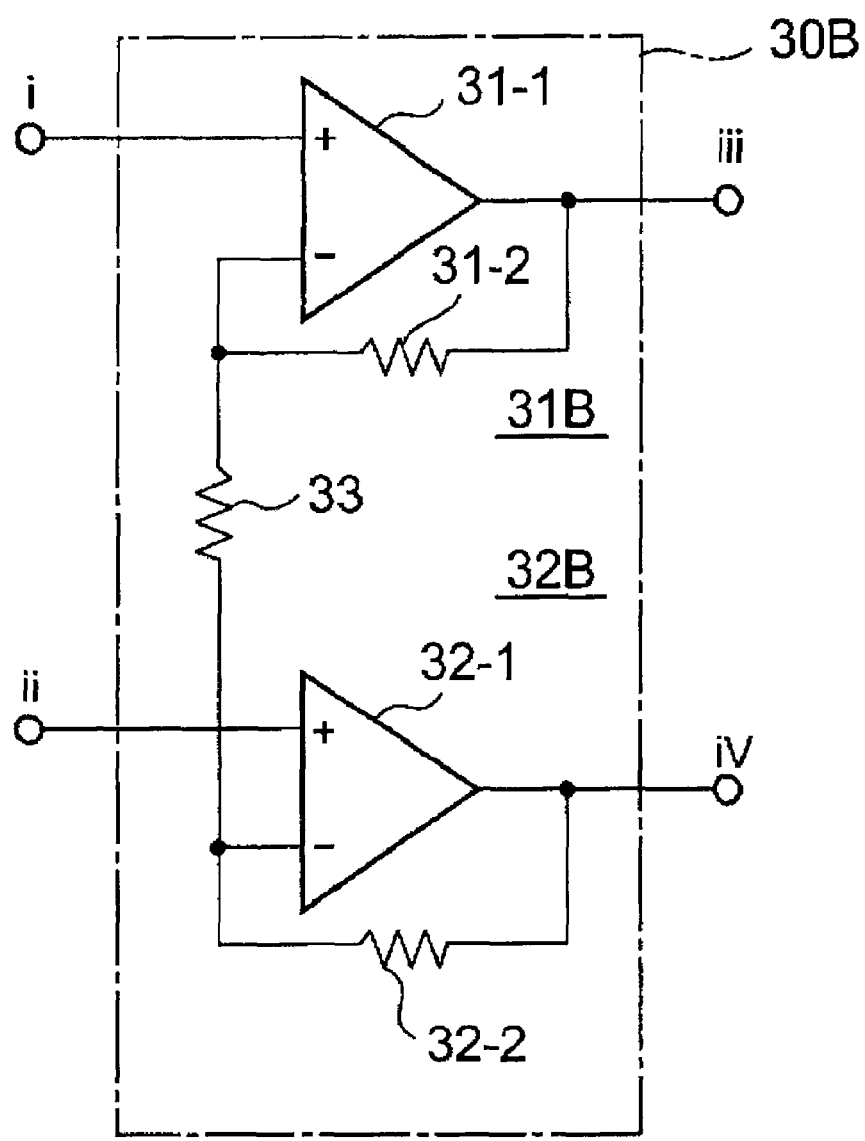
FIG. 3 is a diagram showing a second example of the amplifying unit.

FIG. 3 is a diagram showing a second example of the amplifying unit. An amplifying unit 30B shown in FIG. 3 includes: a first operational amplifier 31-1 that receives a voltage at the first output node i at the non-inverting input terminal thereof and outputs a first amplification output from the output node iii; a first feedback resistor 31-2 provided between the output node iii and the inverting input terminal of the first operational amplifier 31-1; a second operational amplifier 32-1 that receives a voltage at the second output node ii at the non-inverting input terminal thereof and outputs a second amplification output from the output node iv; a second feedback resistor 32-2 provided between the output node iv and the inverting input terminal of the second operational amplifier 32-1; and a third feedback resistor 33 provided between the inverting input terminal of the first operational amplifier 31-1 and the inverting input terminal of the second operational amplifier 32-1.

As described above, the amplifying unit 30B is an amplifier circuit in which the first amplifier circuit 31B and the second amplifier circuit 32B shares the third feedback resistor 33, namely a balanced-input/balanced-output amplifier circuit. With the amplifying unit 30B, as compared with the amplifying unit 30A shown in FIG. 2, it is possible to reduce the number of feedback resistors. In addition, since the reference voltages of the first and second amplifier circuits 31A and 31B are automatically set in the respective circuits, there is no need to set them.

Furthermore, with the amplifying unit 30B that realizes balanced input and balanced output by using a unique configuration, it is possible to increase a gain of the voltage amplification. That is, let the resistance of the feedback resistors 31-2 and 32-2 be R2, and the resistance of the third feedback resistor 33 be R1. Then, the amplification factor α is about 2×R2/R1 (where R2>>R1). As a result of the amplification factor being doubled, it is possible to perform circuit design with ease and use a Hall device with low sensitivity with relative ease. As shown in FIG. 1, the amplifying units 30A and 30B operate on the power supply voltage that is fed to their respective amplifier circuits via the switch circuits 34 and 35.

Figure 4:
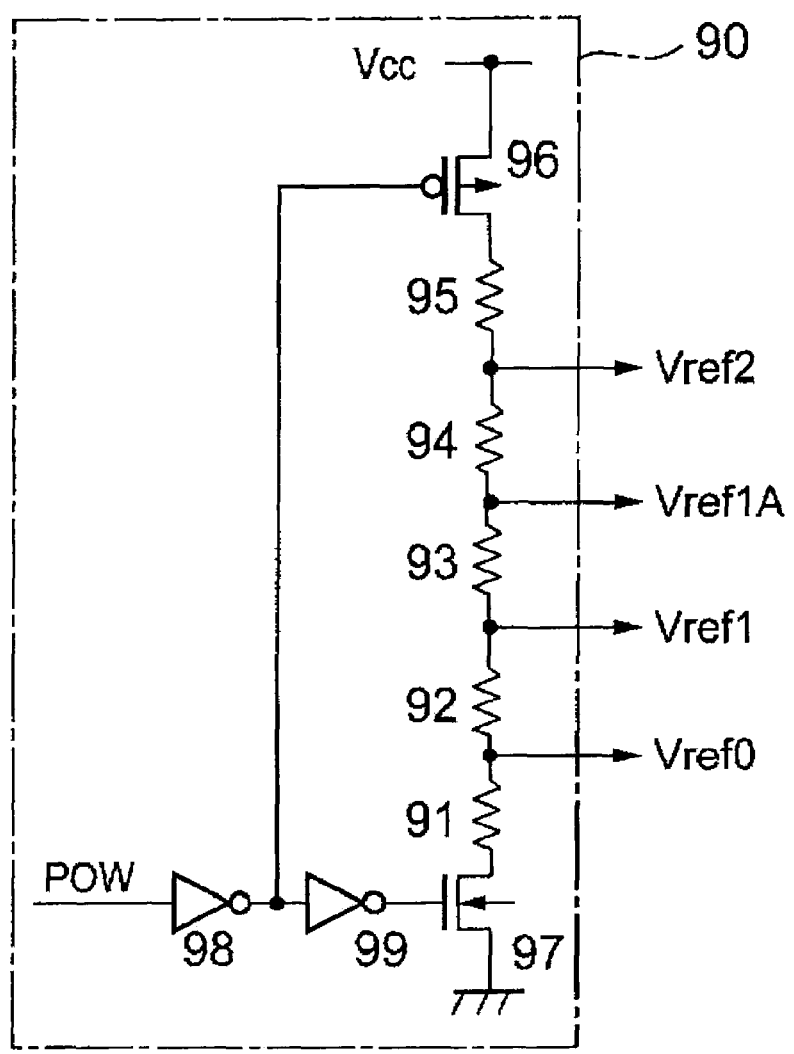
FIG. 4 is a diagram showing the configuration of a reference voltage generation circuit 90.

FIG. 4 is a diagram showing the configuration of a reference voltage generation circuit 90 for producing different reference voltages. In the reference voltage generation circuit 90 shown in FIG. 4, the power supply voltage Vcc is divided by voltage dividing resistors 91 to 95, whereby the reference voltage Vref0, the first reference voltage Vref1, the adjusted first reference voltage Vref1A, and the second reference voltage Vref2 are produced. These reference voltages are produced when a P-channel MOS transistor 96 located on that side of the voltage dividing resistors 91 to 95 where the power supply voltage Vcc is supplied and an N-channel MOS transistor 97 located on that side of the voltage dividing resistors 91 to 95 where they are connected to the ground are turned on. The MOS transistors 96 and 97 are turned on according to the power-supply ON signal POW via the inverters 98 and 99. Alternatively, instead of the power-supply ON signal POW, the MOS transistors 96 and 97 may be turned on according to the first switching signal SW1.

Next, operation of the magnetic sensor circuit of the invention configured as described above will be described with reference also to a timing chart shown in FIG. 5. The power-supply ON signal POW, the first switching signal SW1, the second switching signal SW2, and the clock signal CK are outputted from a control circuit, which will be described later.

First, the power-supply ON signal POW is generated only for a predetermined duration T2 at intervals of a first period T1. As a result, the power supply voltage Vcc is intermittently supplied to the magnetic sensor circuit to permit it to operate. For example, to detect the opening/closing of a cellular phone, it is possible to set the first period T1 to 50 ms and the predetermined duration T2 to 25 μs. This helps greatly reduce the electric power consumption of the battery of the cellular phone without interfering with the detection of the opening/closing of the cellular phone. Preferably, the lengths of the first period T1 and the predetermined duration T2 are appropriately set depending on how the magnetic sensor circuit of the invention is used. Instead of being operated intermittently, the magnetic sensor circuit may be operated continuously.

At almost the same time as time t1 at which the power-supply ON signal POW is applied, the first switching signal SW1 is generated. As a result of the first switching signal SW1 being generated, the switches 21, 23, 25, and 27 are turned on, whereby the switching circuit 20 is brought into the first switching state, and the first and second switch circuits 51 and 52 are turned on.

The power supply voltage Vcc and the ground voltage are applied to the first terminal pair, i.e., the terminals A and C, of the Hall device 10, whereby the Hall voltage appears at the second terminal pair, i.e., the terminals B and D thereof. At this time, the voltage Vb appears at the terminal B, and the voltage Vd appears at the terminal D.

At the first amplification output node iii of the amplifying unit 30, a first amplified voltage α(Vb−Voffa1) obtained by amplifying the voltage Vb appears; at the second amplification output node iv thereof, a second amplified voltage α(Vd−Voffa2) obtained by amplifying the voltage Vd appears. The symbol α represents the amplification factor of the amplifying unit 30, and Voffa1 and Voffa2 are input offset voltages of the first amplifier circuit 31 and the second amplifier circuit 32, respectively.

In this first switching state, the first and second switch circuits 51 and 52 are on, and, if switching of the reference voltage switching circuit 53 is not performed, the switch 53-2 is on. Thus, the first reference voltage Vref1 is applied to the first comparison input node v of the comparing unit 60, and the second reference voltage Vref2 is applied to the second comparison input node vi.

As a result, the first capacitor 41 is charged to a potential difference across it, namely Vref1−α(Vb−Voffa1), whereas the second capacitor 42 is charged to a potential difference across it, namely Vref2−α(Vd−Voffa2).

At time t2, the first switching signal SW1 disappears, whereby the first switching state is ended. After a predetermined short time τ delay, at time t3, the second switching signal SW2 is generated. This predetermined short time τ is provided for setting, between the first switching state and the second switching state of the switching circuit 20, a period which falls outside these switching states. As a result of the second switching signal SW2 being generated, the switches 22, 24, 26, and 28 are turned on, whereby the switching circuit 20 is brought into the second switching state, and the first and second switch circuits 51 and 52 are turned off.

The power supply voltage Vcc and the ground voltage are applied to the second terminal pair, i.e., the terminals B and D, of the Hall device 10, whereby the Hall voltage appears at the second terminal pair, i.e., the terminals C and A thereof. At this time, the voltage Vc appears at the terminal C, and the voltage Va appears at the terminal A.

At the first amplification output node iii of the amplifying unit 30, a first amplified voltage α(Va−Voffa1) obtained by amplifying the voltage Va appears; at the second amplification output node iv thereof, a second amplified voltage α(Vc−Voffa2) obtained by amplifying the voltage Vc appears.

In this second switching state, the first and second switch circuits 51 and 52 are off. Since switching of the reference voltage switching circuit 53 is not yet performed, the switch 53-2 is kept on.

Since the charges stored in the first capacitor 41 and the second capacitor 42 are maintained as they are, a first comparison voltage Vcomp1 at the first comparison input node v of the comparing unit 60 and a second comparison voltage Vcomp2 at the second comparison input node vi thereof are given by formulae (1) and (2) below.

$$Vcomp1 = Vref1 - [\alpha(Vb - Voffa1) - \alpha(Va - Voffa1)] \quad (1)$$
$$= Vref1 - \alpha(Vb - Va)$$

$$Vcomp2 = Vref2 - [\alpha(Vd - Voffa2) - \alpha(Vc - Voffa2)] \quad (2)$$
$$= Vref2 - \alpha(Vd - Vc)$$

As will be understood from formulae (1) and (2) above, the first and second comparison voltages Vcomp1 and Vcomp2 do not contain the input offset voltages Voffa1 and Voffa2. That is, the input offset voltages Voffa1 and Voffa2 are offset by switching between the first switching state and the second switching state.

The comparing unit 60 compares the first and second comparison voltages Vcomp1 and Vcomp2. That is, a difference between the first comparison voltage Vcomp1 and the second comparison voltage Vcomp2 is obtained, and, when the first comparison voltage Vcomp1 is higher than the second comparison voltage Vcomp2 (Vcomp1>Vcomp2), a comparison output is produced. The comparison performed by the comparing unit 60 is expressed by formula (3) below.

$$Vcomp1 - Vcomp2 = Vref1 - Vref2 - \alpha(Vb - Va) + \alpha(Vd - Vc) \quad (3)$$

Incidentally, the Hall voltage produced by the Hall device 10 contains a signal component voltage commensurate with the magnetic field strength and a device offset voltage. For an effective signal component commensurate with the magnetic field strength, a voltage appearing between the terminals B and D of the Hall device 10 in the first switching state is in phase with a voltage appearing between the terminals C and A in the second switching state; for a device offset voltage, the former is opposite in phase to the latter.

Let the device offset voltages contained in the voltages Vb, Vd, Va, and Vc be Vboffe, Vdoffe, Vaoffe, and Vcoffe, respectively. Then, Vboffe−Vdoffe=Vaoffe−Vcoffe holds. Rearranging the formula above gives formula (4) below.

$$Vboffe - Vaoffe = Vdoffe - Vcoffe \quad (4)$$

Formula (4) above indicates that the device offset voltages are cancelled in the comparison between the first comparison voltage Vcomp1 and the second comparison voltage Vcomp2 given by formula (3) above.

As described above, the device offset voltage of the Hall device 10 and the input offset voltage of the amplifying unit 30 are cancelled by the comparison operation performed by the comparing unit 60.

Next, at time t4, the clock signal CK has risen. When the clock signal CK has risen, the latch circuit 70 latches the comparison output from the comparing unit 60. When the comparison output is latched, the detection signal Sdet is generated by the buffer amplifier 80. At time t5, the power-supply ON signal POW disappears, and, at almost the same time, the second switching signal SW2 disappears. Here, the clock signal CK is inverted and delayed so as to produce the second switching signal SW2.

In the second switching state, when the first comparison voltage Vcomp1 is lower than the second comparison voltage Vcomp2, no comparison output is produced (that is, L level). As a result, no detection signal Sdet is generated. However, when the first comparison voltage Vcomp1 is higher than the second comparison voltage Vcomp2, a comparison output is produced (that is, H level). As a result, the detection signal Sdet is generated.

When the detection signal Sdet is generated, switching of the reference voltage switching circuit 53 is performed, whereby the switch 53-2 is turned off and the switch 53-1 is turned on. This results in the application of the adjusted first reference voltage Vref1A to the first comparison input node v of the comparing unit 60 in the first switching state. As a result, in the predetermined duration T2 of a next period, a threshold level for the comparison operation performed by the comparing unit 60 is lowered. That is, the comparing unit 60 exhibits hysteresis. The width of hysteresis equals Vref1A−Vref1, and can be set only by setting the first reference voltage Vref1 and the adjusted first reference voltage Vref1A. This makes it easy to design and adjust the hysteresis width.

According to the invention, the first and second capacitors 41 and 42 are charged to different predetermined levels in the first switching state, whereby the input voltage reference value of the comparing unit 60 is set to the predetermined first and second reference voltages Vref1 and Vref2. By bringing the first and second reference voltages Vref1 and Vref2 as close as possible to half the power supply voltage Vcc (Vcc/2), it is possible to increase the input dynamic range.

Furthermore, the power supply voltage Vcc is intermittently supplied to the principal units, such as the amplifying unit 30 and the comparing unit 60, at the intervals of a first period T1, and this intermittent operation is combined with a latch operation for generating the detection signal Sdet. This makes it possible to reduce the electric power consumption and ensure stable magnetic detection.

As described above, by performing intermittent operation, it is possible to reduce the electric power consumption and ensure stable magnetic detection. This makes the magnetic sensor circuits of the present invention most suitable as sensor circuits for portable terminals (for example, flip phones or slide-up phones) using a battery or the like as a power supply.

The descriptions heretofore deal with a case in which a magnetic field relative to the Hall device 10 points in a certain direction. Needless to say, in a case where the magnetic field points in the opposite direction, a Hall voltage of the opposite polarity is produced. In such a case, the circuit configuration is designed according to the polarity of the Hall voltage.

Second Embodiment

Now, a second embodiment will be described, taking up as an example a magnetic sensor circuit that can detect the magnetic field strength irrespective of the direction of a magnetic field relative to a Hall device.

Figure 6:
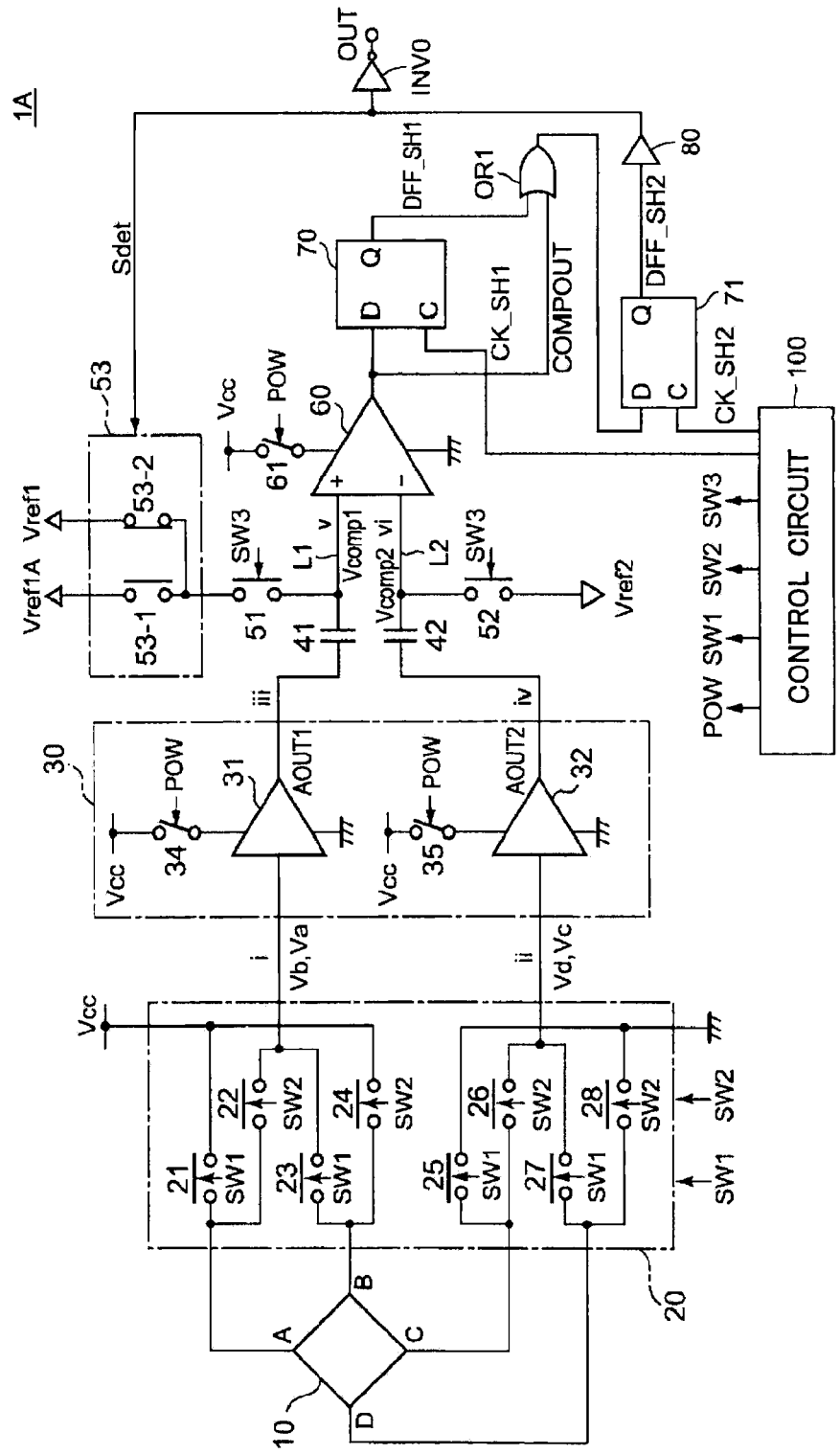
FIG. 6 is a diagram showing the configuration of a magnetic sensor circuit according to a second embodiment of the invention.

FIG. 6 is a diagram showing the configuration of a magnetic sensor circuit according to the second embodiment disclosed in Japanese Patent Application No. 2005-230781, which the applicant of the present invention once filed. In FIG. 6, a magnetic sensor circuit 1A differs from the magnetic sensor circuit shown in FIG. 1 in that it further includes a control circuit 100, an OR circuit OR1, a latch circuit 71, and an inverter INV0. In other respects, the magnetic sensor circuit 1A is the same as the magnetic sensor shown in FIG. 1, and therefore overlapping descriptions will not be repeated.

The control circuit 100 outputs a power-supply ON signal POW, a first switching signal SW1, a second switching signal SW2, a third switching signal SW3, and clock signals CK_SH1 and CK_SH2. The third switching signal SW3 is fed to the first switch circuit 51 and to the second switch circuit 52.

The latch circuit 70 latches a signal COMPOUT (a comparison output) outputted from the comparing unit 60 at the rising edge of the clock signal CK_SH1. The OR circuit OR1 receives the signal COMPOUT and a signal DFF_SH1 (a first latch output) outputted from the latch circuit 70. The latch circuit 71 latches the output of the OR circuit OR1 at the rising edge of the clock signal CK_SH2. As is the case with the latch circuit 70, a D flip-flop is suitably used as the latch circuit 71.

The buffer amplifier 80 amplifies a signal DFF_SH2 (a second latch output) outputted from the latch circuit 71, and outputs a detection signal Sdet. The inverter INV0 inverts the detection signal Sdet, and outputs an output signal OUT. Based on the output signal OUT, it is determined whether or not the magnetic field has a predetermined strength.

Figure 7:
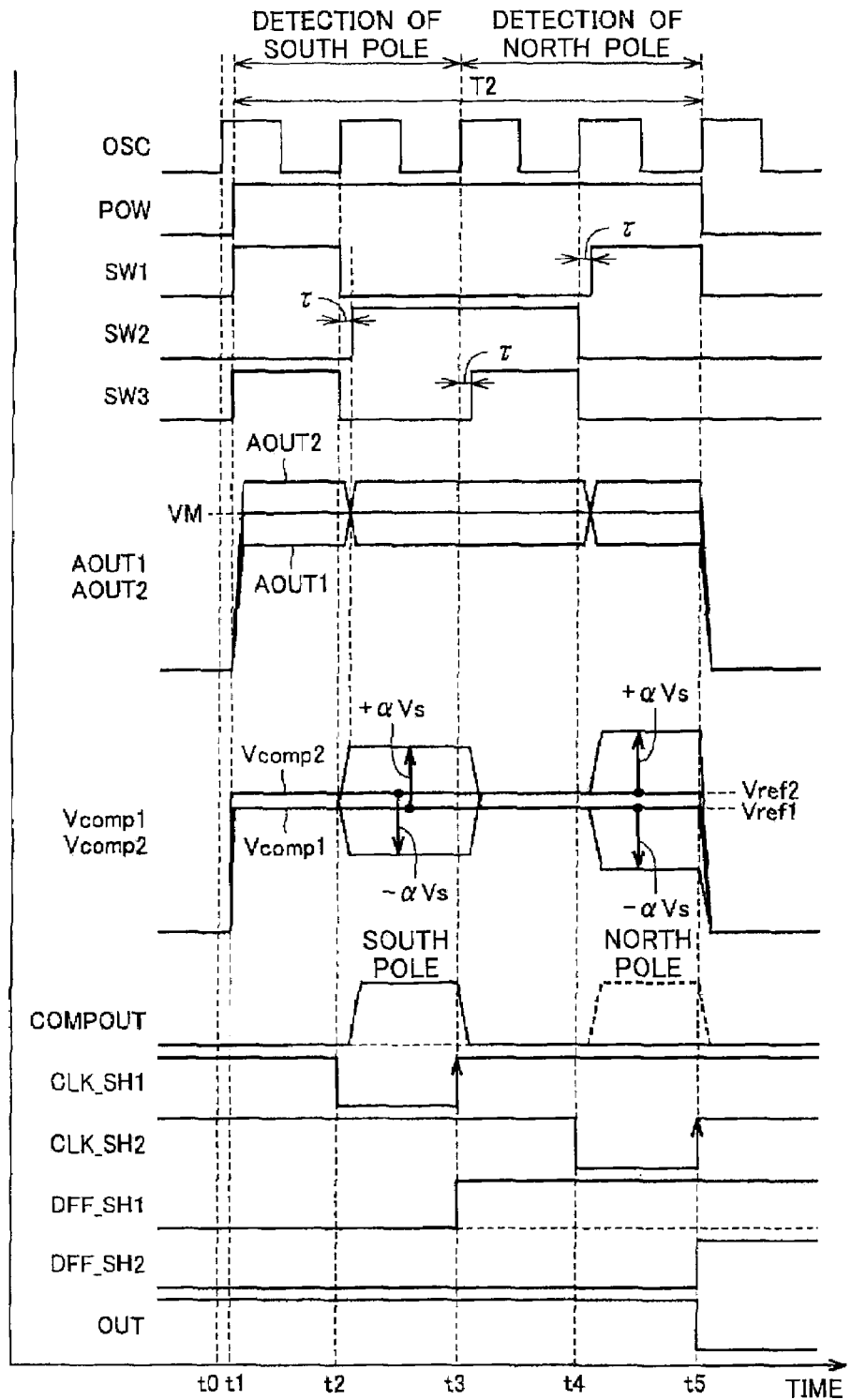
FIG. 7 is a timing chart illustrating operation of the magnetic sensor circuit of the second embodiment of the invention.

FIG. 7 is a timing chart illustrating operation of the magnetic sensor circuit of the second embodiment of the invention. In FIG. 7, a signal OSC is a reference signal for operation of the control circuit 100. As will be described later, the signal OSC is generated within the control circuit 100.

As is the case with the first embodiment, the power-supply ON signal POW is generated only for a predetermined duration T2 at intervals of a first period T1. The duration between time t1 and time t5 corresponds to the predetermined duration T2. The predetermined duration T2 includes first to fourth time periods. A time period between time t1 and time t2, a time period between time t2 and time t3, a time period between time t3 and time t4, and a time period between time t4 and time t5 are the first to fourth time periods, respectively.

The following description assumes that the strength of a magnetic field generated by the south magnetic pole is detected during the first time period and the second time period, and the strength of a magnetic field generated by the north magnetic pole is detected during the third time period and the fourth time period. Alternatively, the strength of a magnetic field generated by the north magnetic pole may be detected first.

The operation of the magnetic sensor circuit 1A from time t1 to time t3 is the same as that of the magnetic sensor circuit of the first embodiment. At time t0, the signal OSC has risen. Then, at time t1, the power-supply ON signal POW is generated. At almost the same time, the first switching signal SW1 and the third switching signal SW3 are generated. As a result of the first switching signal SW1 being generated, the switching circuit 20 is brought into the first switching state. As a result of the third switching signal SW3 being generated, the first switch circuit 51 and the second switch circuit 52 are both turned on.

A voltage AOUT1 and a voltage AOUT2 represent the outputs of the first amplifier circuit 31 and the second amplifier circuit 32, respectively. During a time period between time t0 and time t2, the voltage AOUT1 is $\alpha(Vb-Voffa1)$ and the voltage AOUT2 is $\alpha(Vd-Voffa2)$. The first comparison voltage Vcomp1 at the first comparison input node v of the comparing unit 60 is the first reference voltage Vref1, and the second comparison voltage Vcomp2 at the second comparison input node vi thereof is the second reference voltage Vref2. If there is no signal from the Hall device 10, the voltages AOUT1 and AOUT2 each equal a voltage VM.

During the second time period, the control circuit 100 controls the switching circuit 20 in such a way that it is brought into the second switching state after a predetermined short time r has elapsed after the first switching state was ended (time t2). During the time period between time t2 and time t3, the voltage AOUT1 is $\alpha(Va-Voffa1)$, and the voltage AOUT2 is $\alpha(Vc-Voffa2)$. As expressed by formulae (1) and (2) above, the first comparison voltage Vcomp1 is given by Vref1 $-\alpha(Vb-Va)$, and the second comparison voltage Vcomp2 is given by Vref2$-\alpha(Vd-Vc)$. Here, let the Hall voltage (the voltage across the Hall device) be Vs. Then, the first comparison voltage Vcomp1 changes from Vref1 by $+\alpha Vs$, and the second comparison voltage Vcomp2 changes from Vref2 by $-\alpha Vs$.

When the signal OSC has risen at time t3, the third switching signal SW3 is generated again after a predetermined short time $\tau$ has elapsed. When the third switching signal SW3 is generated, the first comparison voltage Vcomp1 changes to the first reference voltage Vref1, and the second comparison voltage Vcomp2 changes to the second reference voltage Vref2. Since the switching circuit 20 remains in the second switching state, the voltages AOUT1 and AOUT2 are held at $\alpha(Va-Voffa1)$ and $\alpha(Vc-Voffa2)$, respectively.

During the fourth time period, the control circuit 100 controls the switching circuit 20 in such a way that it is brought into the first switching state after a predetermined short time $\tau$ has elapsed after the second switching state was ended (time t4). As a result, the voltage AOUT1 changes to $\alpha(Vb-Voffa1)$, and the voltage AOUT2 changes to $\alpha(Vd-Voffa2)$. The first comparison voltage Vcomp1 changes to Vref1 $-\alpha(Va-Vb)$, and the second comparison voltage Vcomp2 changes to Vref2$-=(Vc-Vd)$. That is, during the fourth time period, the first comparison voltage Vcomp1 changes from Vref1 by $-\alpha Vs$, and the second comparison voltage Vcomp2 changes from Vref2 by $+\alpha Vs$.

When the strength of a magnetic field is equal to or higher than a predetermined level, a signal is outputted from the Hall device 10. This results in the generation of an H-level signal COMPOUT. The time period during which the signal COMPOUT is at H level is between time t2 and time t3 when the magnetic field is generated by the south magnetic pole, and is between time t4 and time t5 when the magnetic field is generated by the north magnetic pole.

The clock signal CK_SH1 has dropped at time t2, and has risen at time t3. At time t3, if the signal COMPOUT is at H level, the signal DFF_SH1 is switched from L level to H level.

The clock signal CK_SH2 has dropped at time t4, and has risen at time t5. At time t5, since the output of the OR circuit OR1 is at H level, the signal DFF_SH2 is switched from L level to H level, and the output signal OUT is switched from H level to L level.

On the other hand, if the signal COMPOUT is at H level at time t5, the output of the OR circuit OR1 is at H level along with the signal COMPOUT. Thus, when the clock signal CLK_SH2 has risen at time t5, the signal DFF_SH2 is switched from L level to H level, and the output signal OUT is switched from H level to L level.

Switching of the output signal OUT from H level to L level indicates that the strength of the magnetic field is equal to or higher than a predetermined level. As described above, the control circuit 100 controls the switching circuit 20 in such a way that it is in the first switching state during the first and fourth time periods, and is in the second switching state during the second and third time periods. In addition, the control circuit 100 turns on the first switch circuit 51 and the second switch circuit 52 during the first and third time periods. This permits the magnetic sensor circuit 1A to detect that the strength of the magnetic field is equal to or higher than a predetermine level irrespective of the direction of the magnetic field relative to the Hall device 10.

The control circuit 100 provides a predetermined short time τ between the falling edge of the first switching signal SW1 and the rising edge of the second switching signal SW2, and between the falling edge of the second switching signal SW2 and the rising edge of the first switching signal SW1. This helps stabilize the first comparison voltage Vcomp1 and the second comparison voltage Vcomp2, thereby preventing a malfunction of the magnetic sensor circuit 1A.

Moreover, the control circuit 100 outputs the second switching signal SW2 continuously from time t2 to time t4. This permits the magnetic sensor circuit 1A to detect the strength of the magnetic field generated by the south and north magnetic poles in a short period of time.

Furthermore, the control circuit 100 makes the magnetic sensor circuit 1A operate intermittently by outputting the power-supply ON signal POW only for a predetermined duration T2. This makes it possible to reduce the electric power consumption of the magnetic sensor circuit 1A.

Next, the control circuit 100 will be described in detail.

Figure 8:
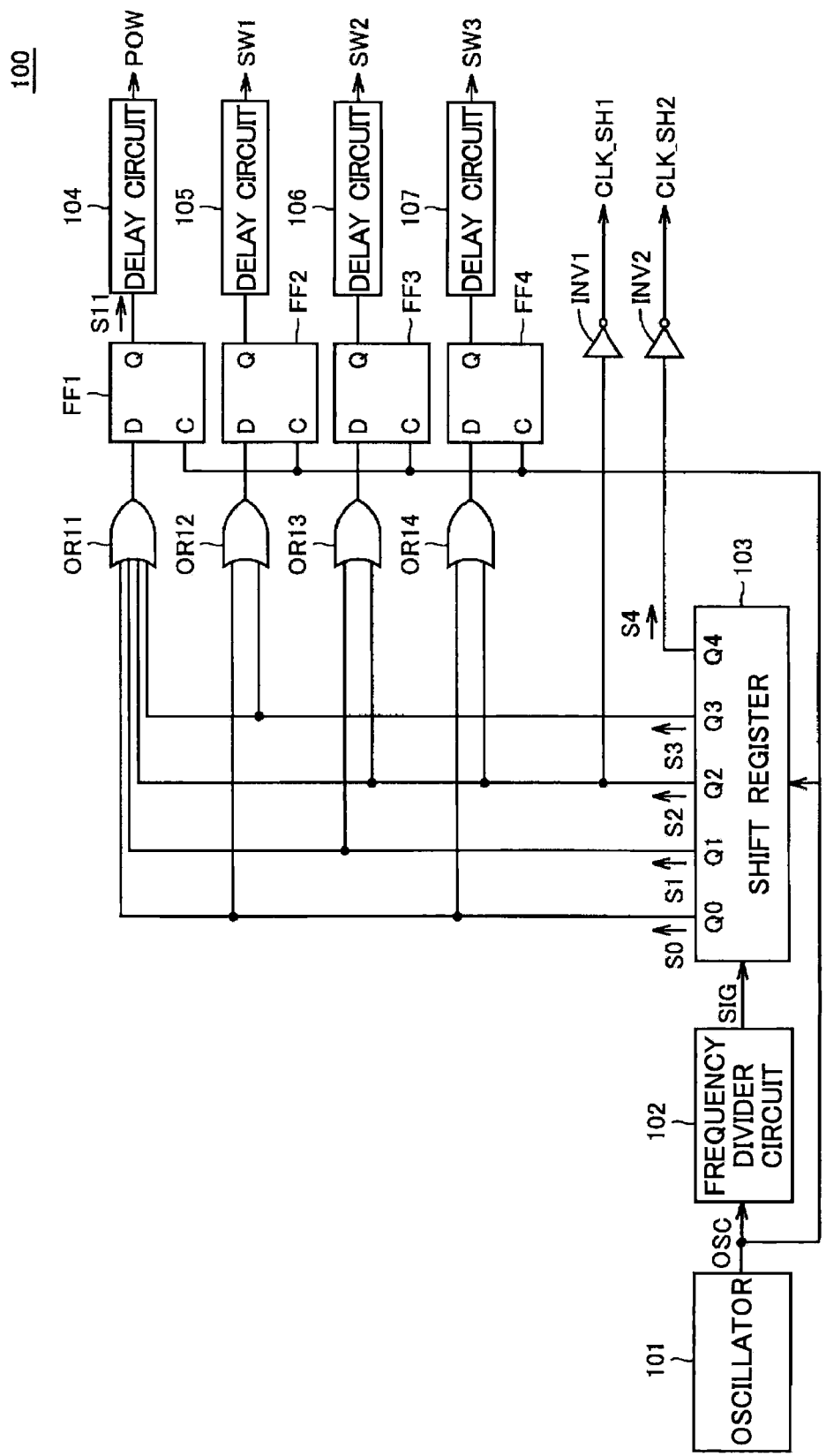
FIG. 8 is a diagram showing the configuration of the control circuit 100 shown in FIG. 6.

FIG. 8 is a diagram showing the configuration of the control circuit 100 shown in FIG. 6.

In FIG. 8, the control circuit 100 includes: an oscillator 101 that outputs a reference clock signal OSC; a frequency divider circuit 102 that divides the frequency of the reference clock signal OSC with a predetermined frequency division ratio (for example, 1/4096) and outputs a start pulse signal SIG; and a shift register 103 that receives the start pulse signal SIG and the reference clock signal OSC and sequentially outputs signals S0 to S4 in synchronism with pulses in the reference clock signal OSC. The shift register 103 outputs the signals S0 to S4 from terminals Q0 to Q4 respectively.

The control circuit 100 further includes OR circuits OR11 to OR14. The OR circuit OR11 receives the signals S0 to S3. The OR circuit OR12 receives the signals S0 and S3. The OR circuit OR13 receives the signals S1 and S2. The OR circuit OR14 receives the signals S0 and S2.

The control circuit 100 further includes D flip-flops FF1 to FF4 that latch the outputs of the OR circuits OR11 to OR14, respectively, at the rising edge of the reference clock signal OSC.

The control circuit 100 further includes delay circuits 104 to 107 that delay the outputs of the D flip-flops FF1 to FF4, respectively, and inverters INV1 and INV2. The delay circuits 104 to 107 output the power-supply ON signal POW, the first switching signal SW1, the second switching signal SW2, and the third switching signal SW3, respectively. The inverter INV1 inverts the signal S2 and outputs the clock signal CLK_SH1. The inverter INV2 inverts the signal S4 and outputs the clock signal CLK_SH2.

The delay circuits 104 to 107 delay only the rising edge of the outputs of the D flip-flops. This makes it possible to provide a predetermined short time τ shown in FIG. 7 between the first switching signal SW1 and the second switching signal SW2.

Figure 9:
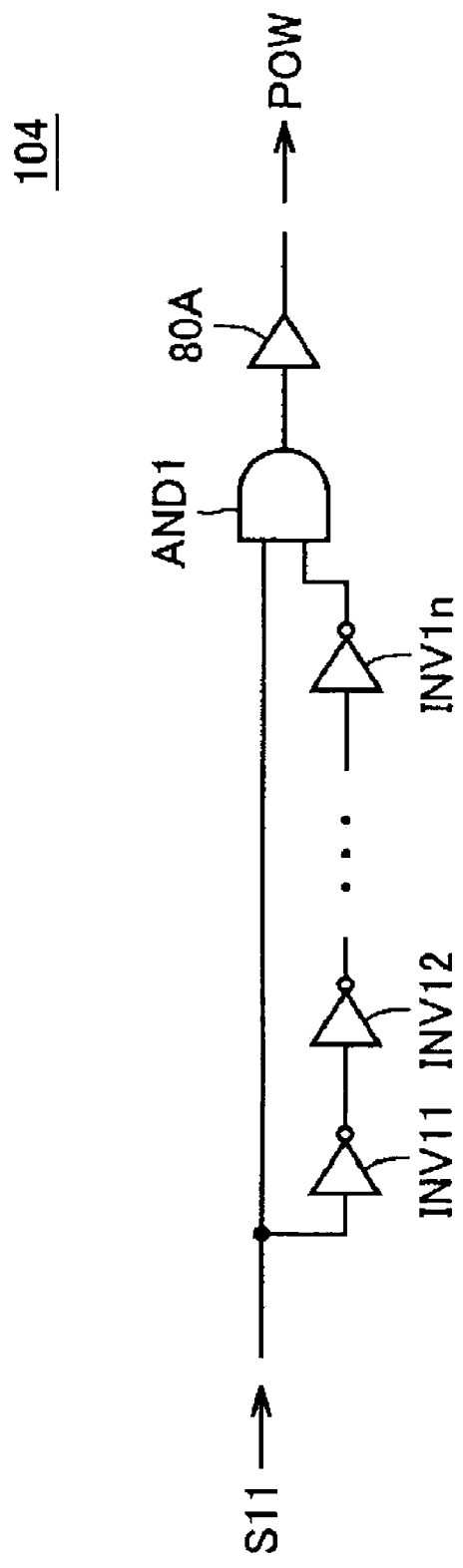
FIG. 9 is a diagram showing an example of the configuration of the delay circuit 104 shown in FIG. 8.

FIG. 9 is a diagram showing an example of the configuration of the delay circuit 104 shown in FIG. 8.

In FIG. 9, the delay circuit 104 is composed of n (n is an even number) inverters INV11 to INV1n connected in series, an AND circuit AND1, and a buffer amplifier 80A. A signal S11 (an output of the D flip-flop FF1) is inputted to one input terminal of the inverter INV11 and to one input terminal of the AND circuit AND1. The AND circuit AND1 receives, at the other input terminal thereof, a signal from the inverter INV1n. The buffer amplifier 80A amplifies the output of the AND circuit AND1, and outputs the power-supply ON signal POW. Here, the number n of inverters is appropriately determined as necessary.

The configurations of the delay circuits 105 to 107 are the same as that of the delay circuit 104, and therefore their explanations will not be repeated.

Next, an example of the configuration for stabilizing the operation of the magnetic sensor circuit according to the invention will be described. Thanks to the comparing unit 60, the magnetic sensor circuit according to the invention suffers less from ripples or noise in the power supply voltage, and can operate stably. As an example of a configuration for further stable operation, an example of the configuration of signal lines L1 and L2 connected respectively to the first comparison input node v and to the second comparison input node vi, a first capacitor 41, and a second capacitor 42 will be described.

Figure 10:
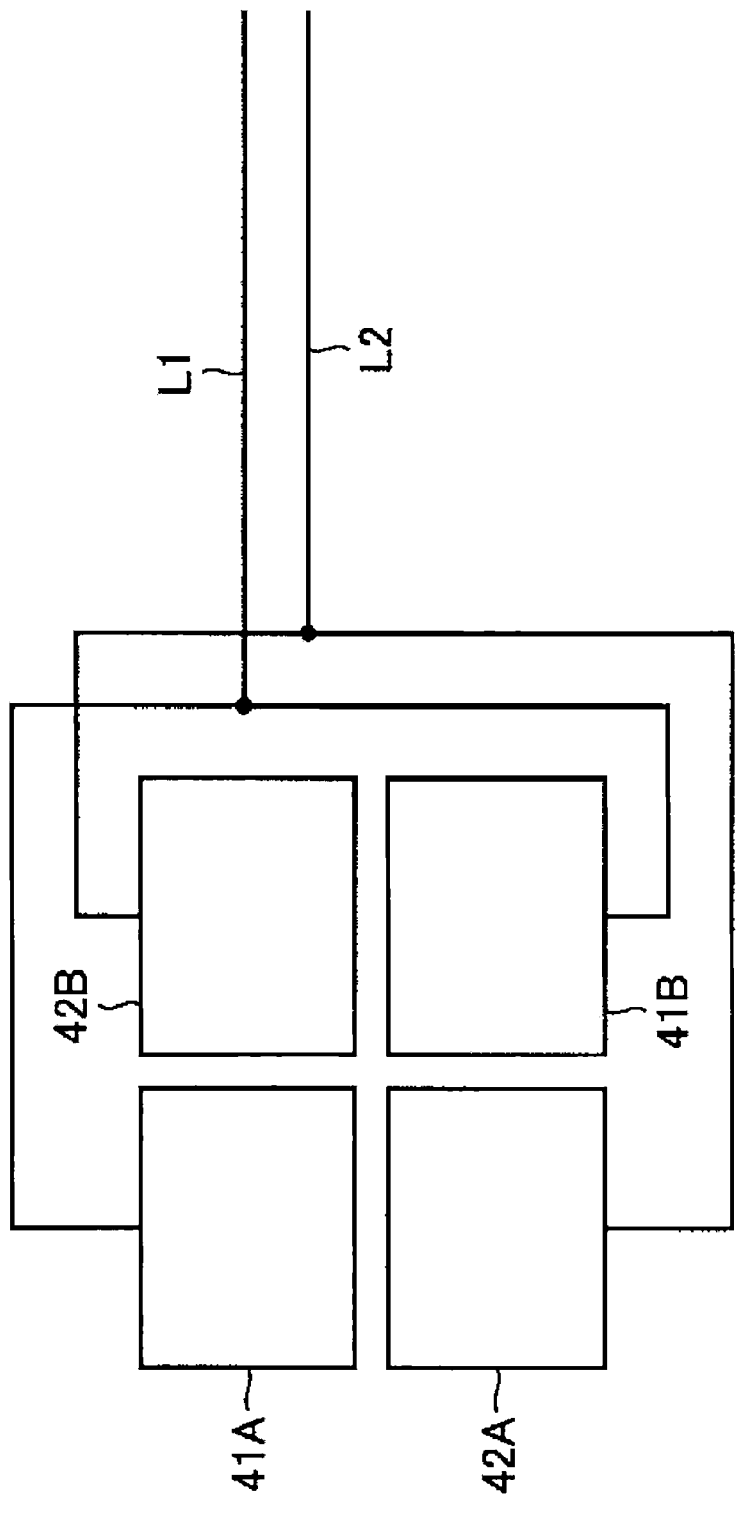
FIG. 10 is a schematic diagram showing an example of the configuration of signal lines L1 and L2, a first capacitor 41, and a second capacitor 42.

FIG. 10 is a schematic diagram showing an example of the configuration of the signal lines L1 and L2, the first capacitor 41, and the second capacitor 42.

In FIG. 10, the first capacitor 41 is divided into capacitors 41A and 41B, and the second capacitor 42 is divided into capacitors 42A and 42B. The capacitors 42A and 42B are arranged in such a way that each of them is disposed along one of two adjacent sides of the capacitor 41A, the two adjacent sides facing the capacitor 41B. The capacitor 41B is disposed to the sides of the capacitors 42A and 42B facing away from the capacitor 41A.

This capacitor arrangement increases the portion where the capacitors face each other. For example, even when a voltage at one end of the capacitor 41A is changed due to noise, the potentials of the capacitors 41A, 42A, and 42B are also changed. Since an in-phase noise component is offset by the comparing unit 60, it is possible to reduce the influence of noise. This helps realize stable operation.

The signal lines L1 and L2 are partially arranged so as to be parallel to each other. When in-phase noise is applied to the signal lines L1 and L2, an in-phase noise component is offset by the comparing unit 60. This helps realize stable operation.

Preferably, the areas of the first capacitor 41 and the second capacitor 42 are set so that the capacitance thereof is greater than the parasitic capacitance of the signal lines L1 and L2. For example, when the time period is shifted from the first time period to the second time period, the voltage AOUT1 changes by +αVs, and the voltage AOUT2 changes by −αVs. However, when the first switch circuit 51 and the second switch circuit 52 are turned off in the second time period, the charges stored in the parasitic capacitance of the signal lines L1 and L2 are released. This may undesirably make the voltages at the first comparison input node v and the second comparison input node vi lower than Vref1+αVs and Vref2−αVs, respectively. To avoid this, the areas of the first capacitor 41 and the second capacitor 42 are increased, so that more charges are stored in the first capacitor 41 and the second capacitor 42. As a result, even when the charges stored in the parasitic capacitance of the signal lines L1 and L2 are released, it is possible to prevent a reduction in the voltages at the first comparison input node v and the second comparison input node vi.

Figure 11:
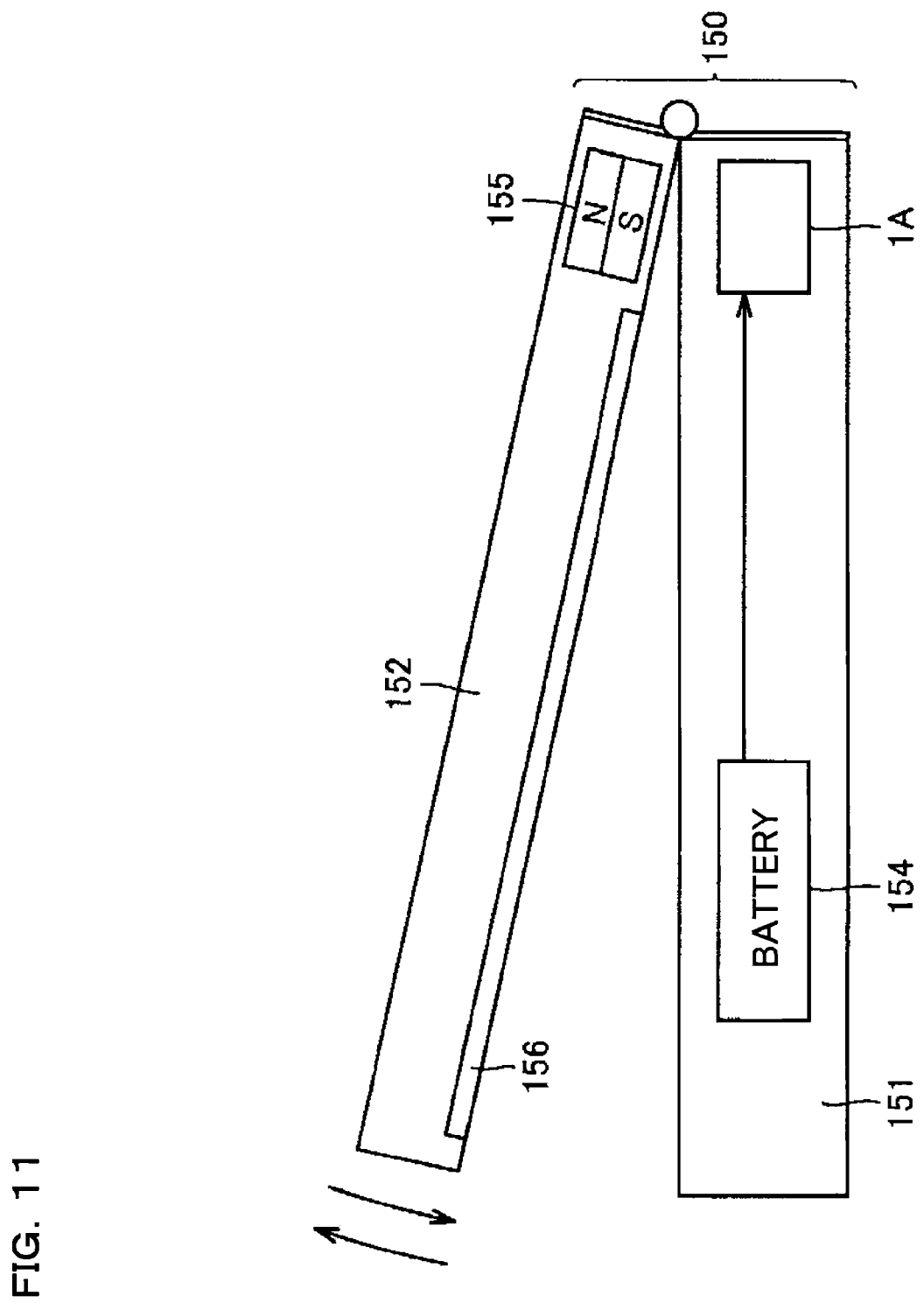
FIG. 11 is a diagram showing an application of a magnetic sensor circuit 1A.

FIG. 11 is a diagram showing an application of the magnetic sensor circuit 1A.

In FIG. 11, a cellular phone 150, which corresponds to a portable terminal according to the invention, is a flip cellular phone. The cellular phone 150 has a main body 151 and a casing 152. The main body 151 includes the magnetic sensor circuit 1A and a battery 154 that supplies a power supply voltage to the magnetic sensor circuit 1A. The casing 152 includes a magnet 155 and a display portion 156.

As the casing 152 moves, the distance between the magnet 155 and the magnetic sensor circuit 1A changes, and accordingly the strength of a magnetic field relative to the magnetic sensor circuit 1A changes. The magnetic sensor circuit 1A detects the strength of the magnetic field, and thereby serves as an opening/closing detection sensor.

The magnetic sensor circuit 1A can detect the strength of the magnetic field irrespective of which magnetic pole (the south magnetic pole or the north magnetic pole) of the magnet 155 faces the surface where the display portion 156 is provided. This eliminates the need to adjust the orientation of the magnet 155 when it is placed in the casing 152, and hence increases productivity in the production of cellular phones.

Incidentally, consider a case where an image taken by a camera (unillustrated) incorporated in the main body 151 is displayed on the display portion 156. Then, the casing 152 is rotated, and the cellular phone 150 is used with the display portion 156 being exposed to the outside. Also in this case, the magnetic sensor circuit 1A can detect the strength of the magnetic field generated by the north magnetic pole. In this way, as compared with a configuration in which two different magnetic sensor circuits, each being capable of only detecting a magnetic field generated by corresponding one of the magnetic poles, are provided, it is possible to make the mounting area smaller, and reduce the electric power consumption of the cellular phone.

Incidentally, it is also possible to incorporate the magnetic sensor circuit described in the first embodiment into the cellular phone 150. However, in this case, the magnet 155 is placed in the casing 152 in such a way that the north or south magnetic pole thereof is made to always face the surface where the display portion 156 is provided.

Figure 5:
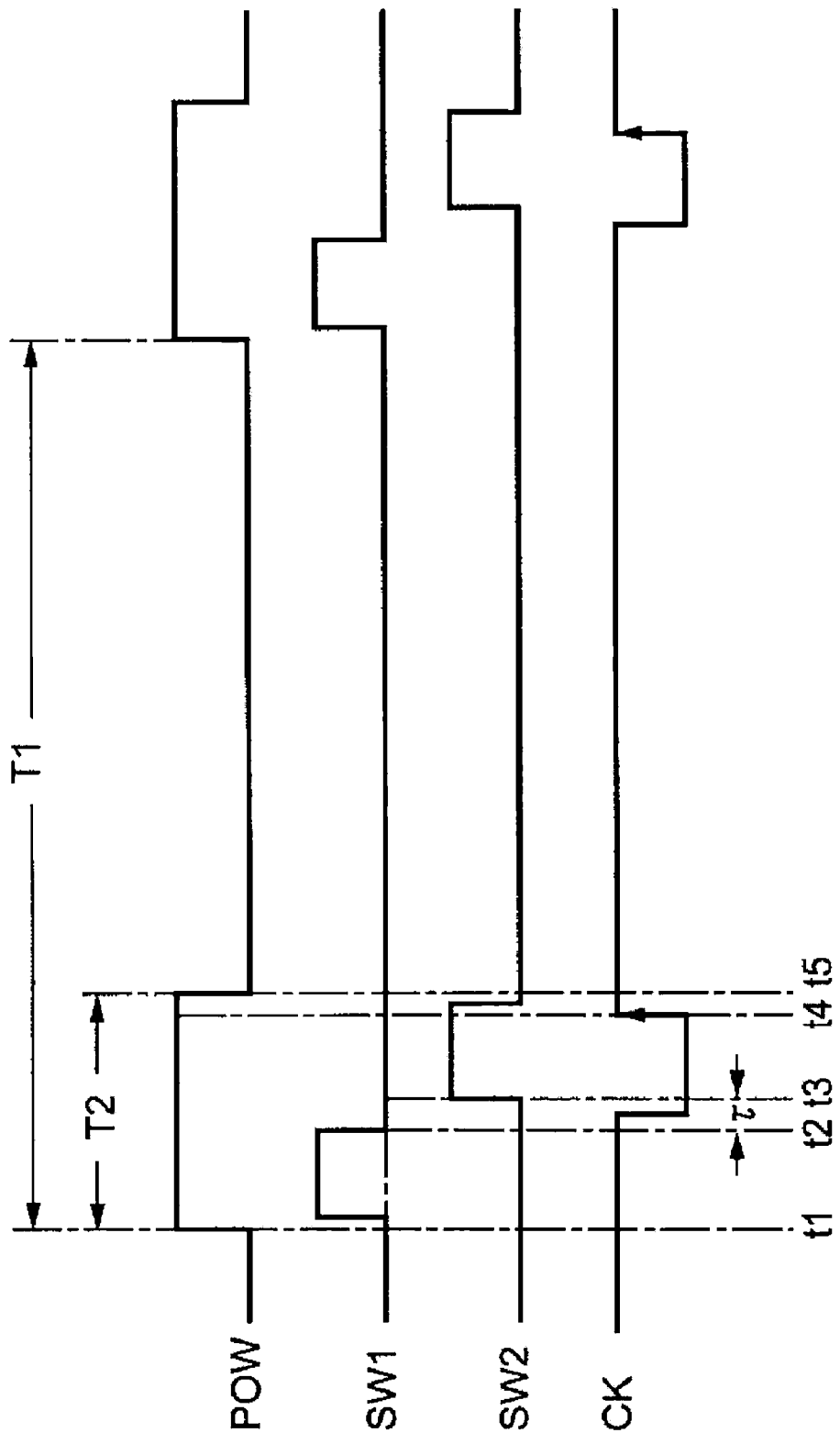
FIG. 5 is a timing chart illustrating operation of a magnetic sensor circuit of the first embodiment of the invention.

Alternatively, the control circuit 100 may output the power-supply ON signal POW, the first switching signal SW1, and the second switching signal SW2 according to the timing chart shown in FIG. 5.

As described above, according to the second embodiment of the invention, by providing a control circuit that controls a switching circuit for switching an output of the Hall device and a switch for feeding a reference voltage to an input terminal of the comparing unit, it is possible to detect the strength of a magnetic field irrespective of the magnetic pole.

Third Embodiment

A third embodiment will be described, taking up as an example a magnetic sensor circuit that can compensate for the temperature characteristic of the sensitivity with which to detect the magnetic field strength. The overall configuration of the magnetic sensor circuit of the third embodiment is the same as that of the magnetic sensor circuit shown in FIG. 1 (or FIG. 6), and therefore overlapping descriptions will not be repeated.

Figure 12:
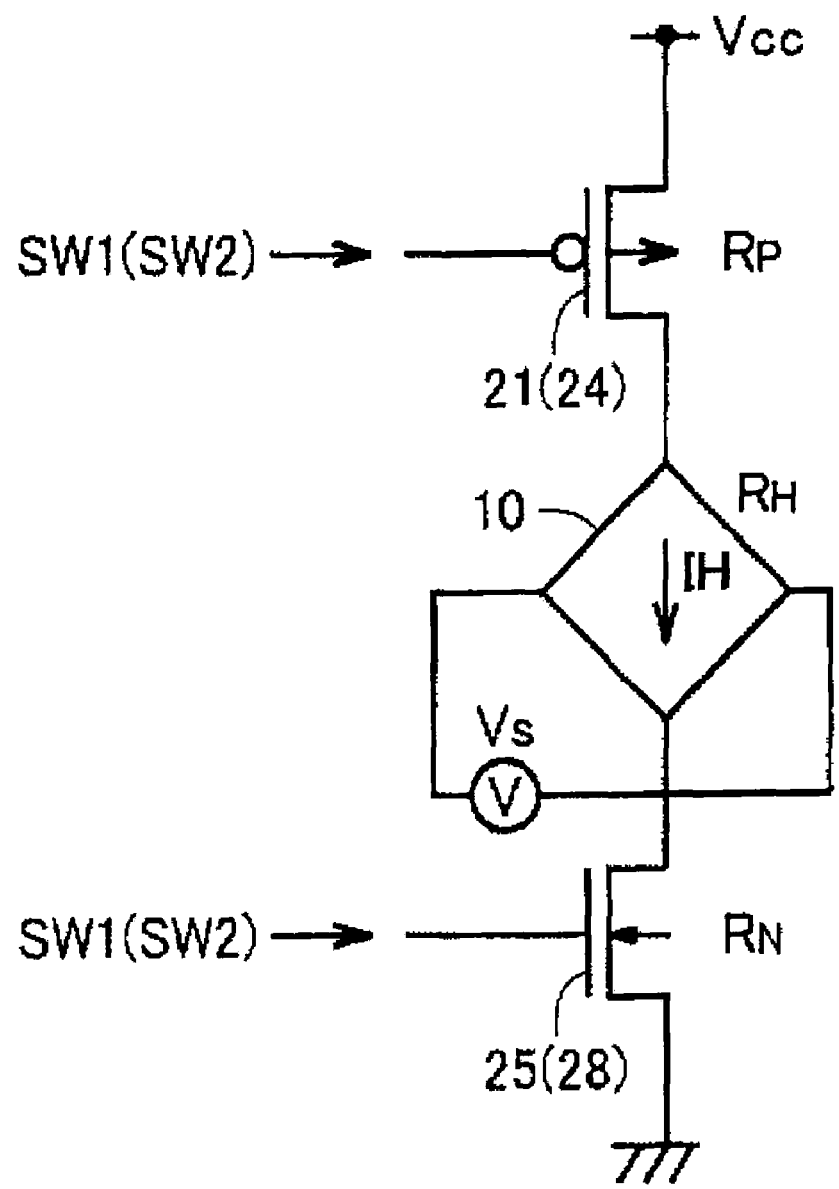
FIG. 12 is a diagram illustrating a current passing through the Hall device 10 shown in FIG. 1.

FIG. 12 is a diagram illustrating a current passing through the Hall device 10 shown in FIG. 1.

In FIG. 12, the switches 21 and 24 are each composed of a P-channel MOS transistor, and the switches 25 and 28 are each composed of an N-channel MOS transistor. The on resistance of the P-channel MOS transistor is RP, and the on resistance of the N-channel MOS transistor is RN. The resistance of the Hall device 10 is RH. The Hall voltage Vs outputted from the Hall device 10 is given by formula (5) below.

$$Vs = KH \times IH \times B \tag{5}$$

Here, KH represents a Hall coefficient, IH represents a current passing through the Hall device 10, and B represents a magnetic field density (a design value of the magnetic flux density to which the magnetic sensor circuit responds). As expressed by formula (5), the voltage Vs is proportional to the current IH.

On the other hand, the current IH is given by formula (6) below.

$$IH = Vcc/(RP + RH + RN) \tag{6}$$

Figure 13:
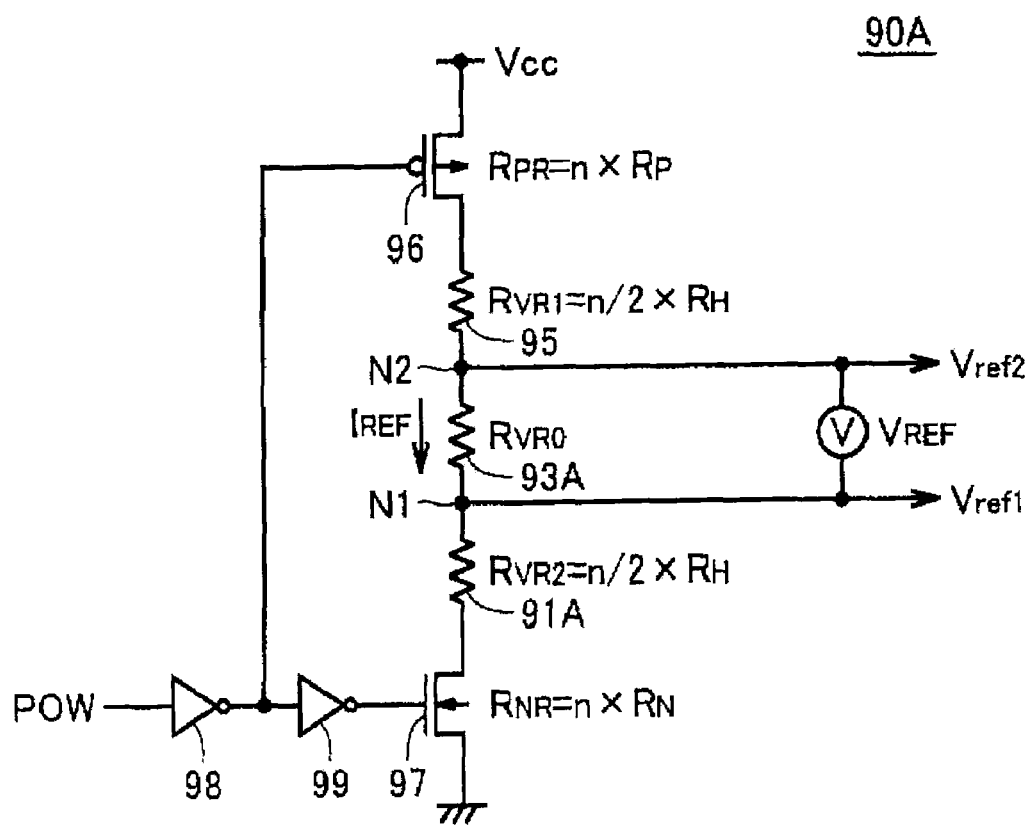
FIG. 13 is a diagram showing a reference voltage generation circuit applied to a third embodiment of the invention.

FIG. 13 is a diagram showing a reference voltage generation circuit applied to the third embodiment of the invention.

A reference voltage generation circuit 90A shown in FIG. 13 can be applied to the magnetic sensor circuits of the first and second embodiments. The reference voltage generation circuit 90A differs from the reference voltage generation circuit 90 shown in FIG. 4 in that the voltage dividing resistors 91 to 94 are replaced by voltage dividing resistors 91A and 93A. In other respects, the reference voltage generation circuit 90A is the same as the reference voltage generation circuit 90, and therefore overlapping descriptions will not be repeated.

The voltage dividing resistor 93A is connected between a first reference voltage node N1 from which the first reference voltage Vref1 is outputted and a second reference voltage node N2 from which the second reference voltage Vref2 is outputted. The voltage dividing resistor 91A is connected at one end thereof to the first reference voltage node N1. One end of the voltage dividing resistor 95 is connected to the second reference voltage node N2. When the power-supply ON signal POW is generated, the other end of the voltage dividing resistor 91A can be connected to the ground potential. When the power-supply ON signal POW is generated, the other end of the voltage dividing resistor 95 can be connected to the power supply voltage Vcc.

The voltage dividing resistor 91A corresponds to a resistor into which the voltage dividing resistors 91 and 92 shown in FIG. 4 are combined, and the voltage dividing resistor 93A corresponds to a resistor into which the voltage dividing resistors 93 and 94 shown in FIG. 4 are combined.

Here, the resistance RVR1 of the voltage dividing resistor 95 and the resistance RVR2 of the voltage dividing resistor 91A are both given by $n/2 \times RH$. The resistance RVR0 of the voltage dividing resistor 93A is smaller than the sum of the resistances RVR1 and RVR2, and $n \times RH \gg RVR0$ holds.

Let a voltage across the voltage dividing resistor 93A be VREF (=Vref2−Vref1), and a current passing through the voltage dividing resistor 93A be IREF. Then, the voltage VREF is given by formula (7) below.

$$VREF = IREF \times RVR0 \tag{7}$$

Let the on resistance of the P-channel MOS transistor 96 be RPR, and the on resistance of the N-channel MOS transistor

97 be RNR. The on resistances RPR and RNR are n times greater than those of the P-channel MOS transistor and the N-channel MOS transistor shown in FIG. 12, respectively, and RPR=n×RP and RNR=n×RN hold. In this case, the current IREF is given by formula (8) below.

$$IREF=Vcc/\{n(RP+RH+RN)+RVR0\} \qquad (8)$$

Since n×RH>>RVR0, RVR0 in formula (8) can be ignored. Thus, according to formulae (6) and (8), the relationship between the current IH and the current IREF is given by formula (9) below.

$$IH=n \times IREF \qquad (9)$$

According to formulae (5), (7), and (9), the sensitivity of the magnetic sensor circuit (=Vs/VREF) is given by formula (10) below.

$$Vs/VREF=n \times KH \times B/RVR0 \qquad (10)$$

According to formula (10) above, when the amount of change in the resistance RVR0 of the voltage dividing resistor 93A relative to the temperature is small (for example, in a case where it is smaller than the amount of change in the resistance RH relative to the temperature, or equals zero), it is possible to compensate for the temperature characteristic of the sensitivity. Here, the sensitivity depends on the resistance ratio n. According to formula (9) above, if the temperature characteristic of the current IH is the same as that of the current IREF, the value n becomes constant. That is, if the temperature characteristic of the resistances of the voltage dividing resistors 91A and 95 is the same as that of the resistance RH, it is possible to compensate for the temperature characteristic of the sensitivity.

That is, to compensate for the temperature characteristic of the sensitivity, the following criteria must be satisfied. First, the resistance of the voltage dividing resistor 93A is smaller than the sum of the resistance of the voltage dividing resistor 91A and the resistance of the voltage dividing resistor 95. Second, the amount of change in the resistance of the voltage dividing resistor 93A relative to the temperature is smaller than the amount of change in the electric resistance of the Hall device 10 relative to the temperature. Third, the temperature coefficient of the resistance of the voltage dividing resistor 91A and the temperature coefficient of the resistance of the voltage dividing resistor 95 are both the same as the temperature coefficient of the electric resistance of the Hall device 10.

To set the voltage dividing resistors 91A and 95 and the Hall device 10 as described above, it is necessary simply to form the Hall device 10 and the voltage dividing resistors 91A and 95 on a single semiconductor substrate by using resistor elements (for example, diffused resistors) made of the same material.

As described above, according to the third embodiment, by using, in the reference voltage generation circuit, a voltage dividing resistor having the same temperature characteristic as the resistance of the Hall device and a voltage dividing resistor having a temperature coefficient and a resistance that are smaller than those of that voltage dividing resistor, it is possible to compensate for the temperature characteristic of detection sensitivity.

Fourth Embodiment

As compared to the magnetic sensor circuits according to the first to third embodiments, with a magnetic sensor circuit according to a fourth embodiment, it is possible to reduce the first period T1.

Figure 14:
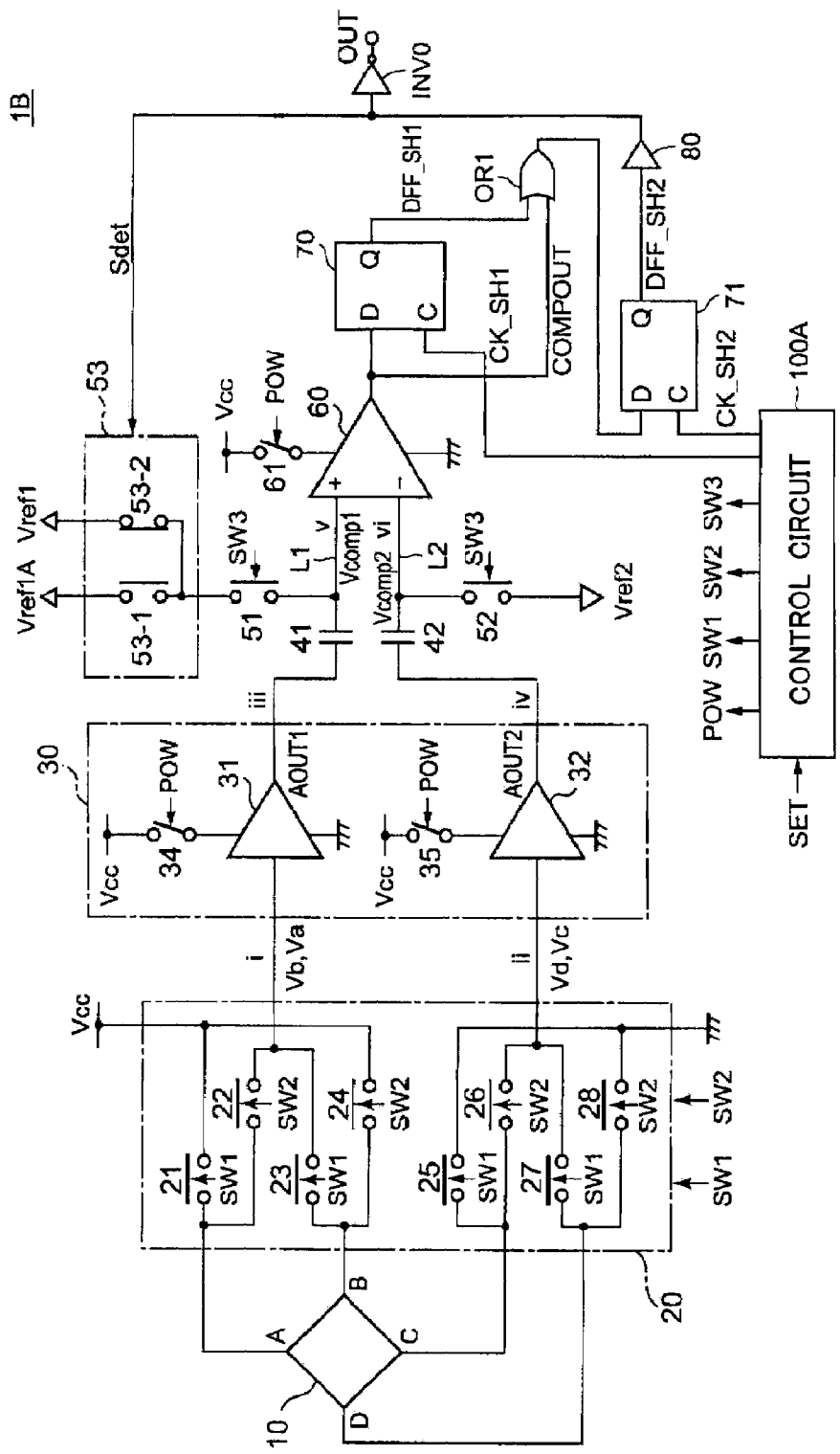
FIG. 14 is a diagram showing the configuration of a magnetic sensor circuit according to a fourth embodiment of the invention.

FIG. 14 is a diagram showing the configuration of a magnetic sensor circuit according to the fourth embodiment of the invention.

In FIG. 14, a magnetic sensor circuit 1B differs from the magnetic sensor circuit 1A shown in FIG. 6 in that it includes a control circuit 100A instead of a control circuit 100. In other respects, the magnetic sensor circuit 1B is the same as the magnetic sensor circuit 1A, and therefore overlapping descriptions will not be repeated.

In response to an input of a start input signal SET, the control circuit 100A makes the first period T1 shorter than that observed when no start input signal SET is inputted. When no start input signal SET is inputted, the length of the first period T1 is, for example, 50 ms; when a start input signal SET is inputted, the length thereof is, for example, 0.2 ms.

By making the first period T1 shorter than that observed when a normal operation is performed, it is possible to shorten an inspection time in the inspection process before shipment of magnetic sensor circuits. This helps increase productivity in the production of magnetic sensor circuits.

Figure 15:
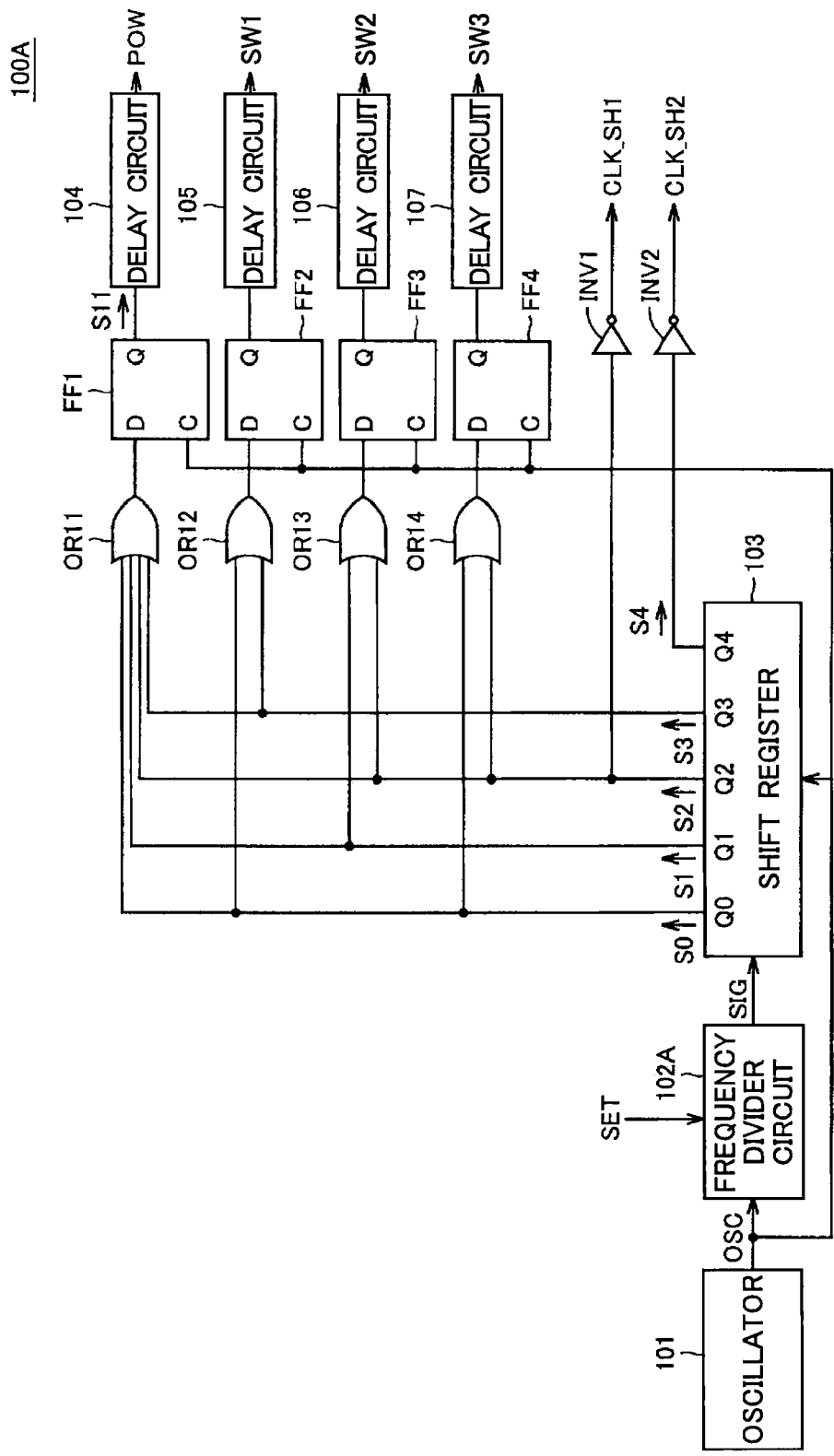
FIG. 15 is a diagram showing the configuration of the control circuit 100A shown in FIG. 14.

FIG. 15 is a diagram showing the configuration of the control circuit 100A shown in FIG. 14.

In FIG. 15, the control circuit 100A differs from the control circuit 100 in that it includes a frequency divider circuit 102A instead of a frequency divider circuit 102. In other respects, the control circuit 100A is the same as the control circuit 100, and therefore overlapping descriptions will not be repeated.

The frequency divider circuit 102A changes a frequency division ratio of a reference clock signal OSC depending on the presence or absence of a start input signal SET. This makes it possible to reduce the length of the first period T1 when a start input signal SET is inputted.

Figure 16:
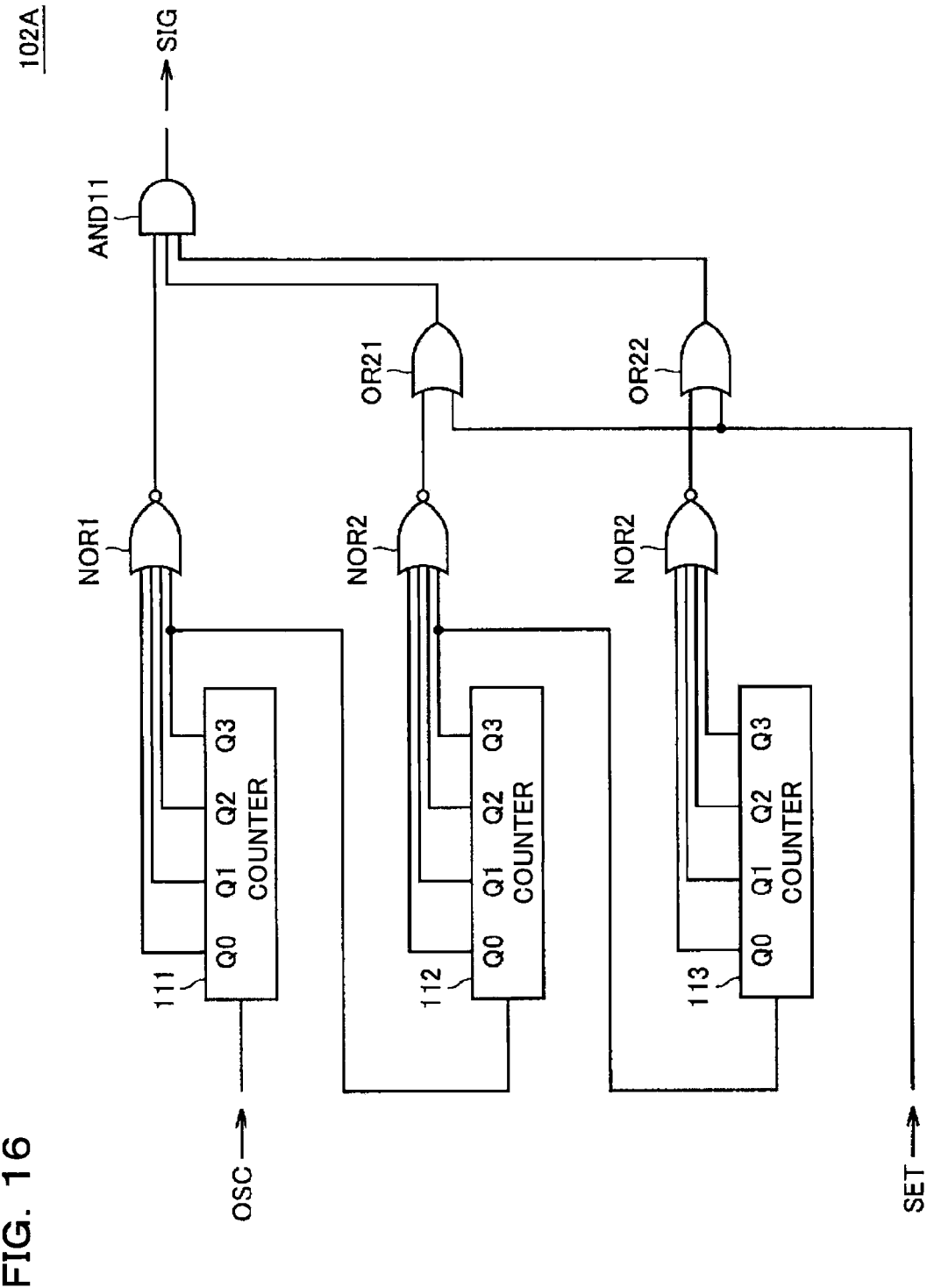
FIG. 16 is a diagram showing an example of the configuration of the frequency divider circuit 102A shown in FIG. 15.

FIG. 16 is a diagram showing an example of the configuration of the frequency divider circuit 102A shown in FIG. 15.

In FIG. 16, the frequency divider circuit 102A includes counters 111 to 113, NOR circuits NOR1 to NOR3, and an AND circuit AND11.

The counters 111 to 113 are, for example, hexadecimal counters. The counter 111 outputs pulses from its terminals Q0 to Q3 according to a pulse number of the reference clock signal OSC. The pulses outputted from the terminals Q0 to Q3 of the counter 111 are inputted to the NOR circuit NOR1. According to the pulse outputted from the terminal Q3 of the counter 111, the counter 112 outputted pulses from its terminals Q0 to Q3. The pulses outputted from the terminals Q0 to Q3 of the counter 112 are inputted to the NOR circuit NOR2. According to the pulse outputted from the terminal Q3 of the counter 112, the counter 113 outputs pulses from the terminals Q0 to Q3. The pulses outputted from the terminals Q0 to Q3 of the counter 113 are inputted to the NOR circuit NOR3.

An output of the NOR circuit NOR2 and the start input signal SET are inputted to an OR circuit OR21. An output of the NOR circuit NOR3 and the start input signal SET are inputted to an OR circuit OR22.

Upon receiving the output of the NOR circuit NOR1 and the outputs of the OR circuits OR21 and OR22, the AND circuit AND11 outputs a start pulse signal SIG. When the start input signal SET takes an L level, every time the pulse number of the reference clock signal OSC reaches 4096, one pulse is outputted as a start pulse signal SIG. On the other hand, when the start input signal SET takes an H level, every time the pulse number of the reference clock signal OSC reaches 16, a start pulse signal SIG is outputted. That is, when the start input signal SET is inputted (when the signal SET takes an H level), the length of the first period T1 is reduced.

It is to be understood that the counter is not limited to a hexadecimal counter, but may be of any other type, such as a decimal counter. Also, the number of counters is not limited to three; any number of counters may be used as appropriate.

As described above, according to the fourth embodiment, it is possible to reduce the length of the first period according to a setting signal inputted to a control circuit. This helps increase productivity in the production of magnetic sensor circuits.

Fifth Embodiment

A fifth embodiment will be described, taking up as an example a magnetic sensor circuit that can arbitrarily change the first period T1 (that is, an intermitted operation period) of the power-supply ON signal POW. The overall configuration of the magnetic sensor circuit of the fifth embodiment is the same as that of the magnetic sensor circuit 1B shown in FIG. 14 (the fourth embodiment). The magnetic sensor circuit of the fifth embodiment is characterized in that it includes a start pulse signal generation circuit instead of a frequency divider circuit 102A (see FIGS. 15 and 16) constituting the control circuit 10A. Therefore, detailed descriptions of such components as find their counterparts in the fourth embodiment will be omitted, and explanations will be given with emphasis placed on the start pulse signal generation circuit.

Figure 17A:
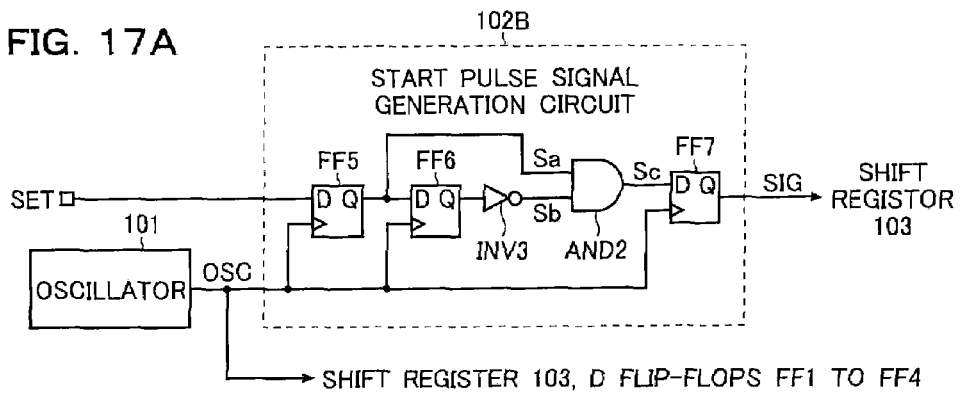
FIGS. 17A to 17C are diagrams each showing an example of the configuration of a start pulse signal generation circuit applied to a fifth embodiment of the invention.
Figure 17B:
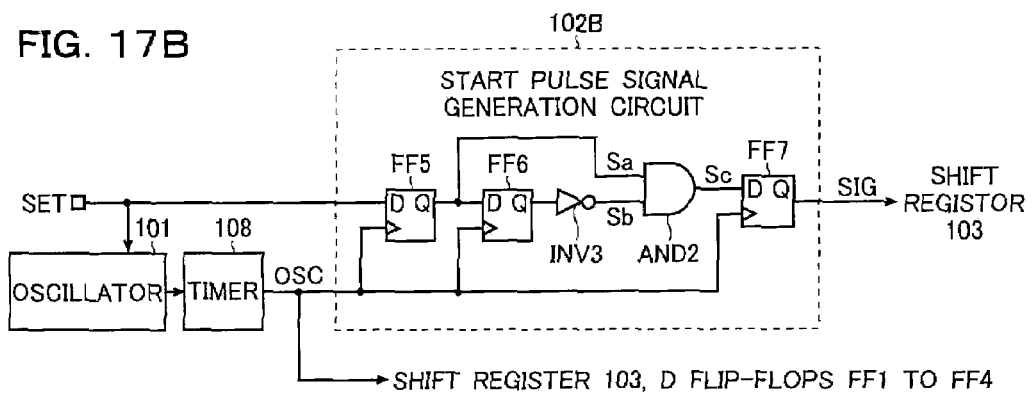
Figure 17C:
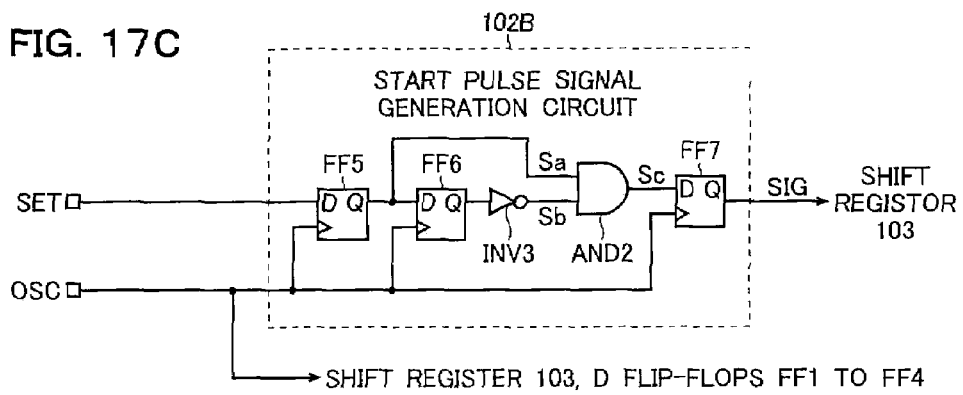

FIGS. 17A to 17C are diagrams each showing an example of the configuration of a start pulse signal generation circuit applied to the fifth embodiment of the invention.

As shown in FIG. 17A, a start pulse signal generation circuit 102B includes D flip-flops FF5 to FF7, an inverter INV3, and an AND circuit AND2.

The data input terminal (D) of the D flip-flop FF5 is connected to an input terminal of the start input signal SET, which is inputted thereto under control of another control IC (for example, a microcomputer) or manually. The output terminal (Q) of the D flip-flop FF5 is connected to the data input terminal (D) of the D flip-flop FF6, and is connected to one input terminal of the AND circuit AND2. The output terminal (Q) of the D flip-flop FF6 is connected via the inverter INV3 to the other input terminal of the AND circuit AND2. The data input terminal (D) of the D flip-flop FF7 is connected to the output terminal of the AND circuit AND2. The output terminal (Q) of the D flip-flop FF7, which serves as a start pulse signal output terminal of the start pulse signal generation circuit 102B, is connected to a start pulse signal input terminal of the shift register 103. The clock input terminals of the D flip-flops FF5 to FF7 are connected to a reference clock signal output terminal of the oscillator 101 that generates a reference clock signal OSC.

Although the following descriptions deal solely with a case where the D flip-flops FF5 to FF7 latch signals inputted to their respective data input terminals (D) at the rising edge of the reference clock signal OSC, they may latch the signals at the falling edge of the reference clock signal OSC.

Figure 18:
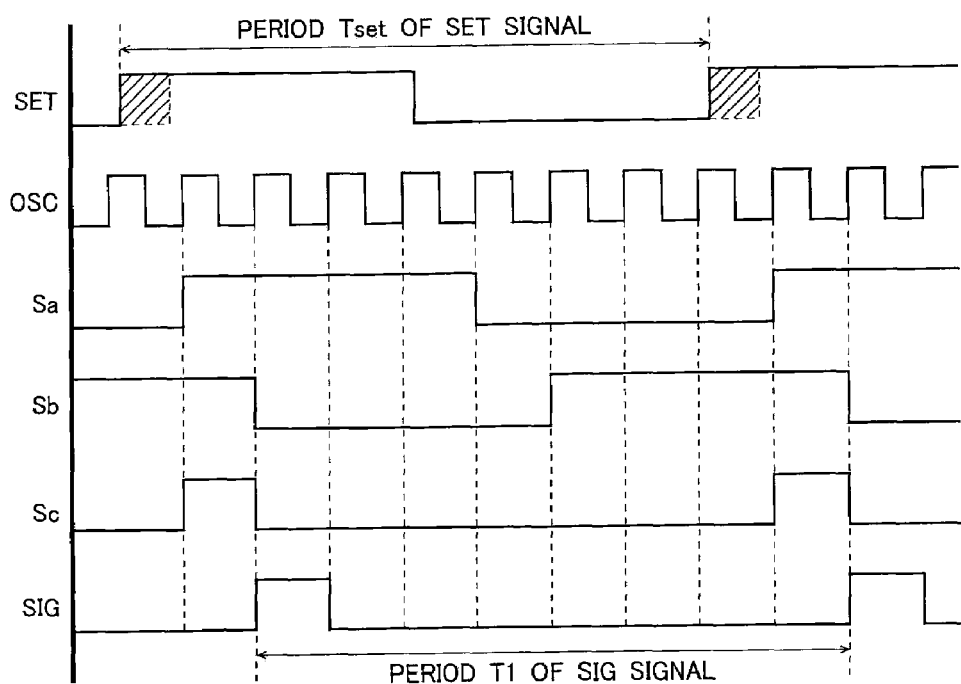
FIG. 18 is a timing chart illustrating operation of a start pulse signal generation circuit 102B.

With reference to FIG. 18, operation of the start pulse signal generation circuit 102B configured as described above will be described in detail.

FIG. 18 is a timing chart illustrating the operation of the start pulse signal generation circuit 102B. Note that symbols Sa, Sb, and Sc shown in this figure represent voltage waveforms of the signals Sa, Sb, and Sc, respectively, shown in FIG. 17.

The start input signal SET inputted to the start pulse signal generation circuit 102B is a pulse signal having a given pulse period Tset. The pulse period Tset is arbitrarily changed when the pulse period T1 of the start pulse signal SIG (and hence the pulse period T1 of the power-supply ON signal POW) is set. A pulse width of the start input signal SET is set so as to be wider than that of the reference clock signal OSC. Alternatively, as shown in FIG. 18, the start input signal SET and the reference clock signal OSC may be asynchronous.

The D flip-flop FF5 latches the start input signal SET at the rising edge of the reference clock signal OSC. As a result, the signal Sa inputted from the D flip-flop FF5 to the one input terminal of the AND circuit AND2 is a start input signal SET synchronized with the reference clock signal OSC.

The D flip-flop FF6 latches the signal Sa at the rising edge of the reference clock signal OSC. As a result, the signal Sb inputted from the D flip-flop FF6 to the other input terminal of the AND circuit AND2 via the inverter INV3 is a signal obtained by delaying the signal Sa by one pulse period of the reference clock signal OSC and then inverting the logic of the resultant delay signal.

The AND circuit AND2 takes the AND of the signal Sa and the signal Sb. As a result, the signal Sc inputted from the AND circuit AND2 to the data input terminal (D) of the D flip-flop FF7 is a pulse signal that takes a high level only when the signals Sa and Sb both take a high level and that otherwise takes a low level.

The D flip-flop FF7 latches the signal Sc at the rising edge of the reference clock signal OSC. As a result, the start pulse signal SIG outputted from the D flip-flop FF7 is a delay signal obtained by delaying the signal Sc by one pulse period of the reference clock signal OSC.

As a result of the start input signal SET and the reference clock signal OSC being asynchronous, the pulse period T1 of the start pulse signal SIG contains an error of up to one pulse period of the reference clock signal OSC with respect to the pulse period Tset of the start input signal SET (see a hatched portion in the figure). However, it is believed that such an error does not arise any particular problem as long as the pulse period of the reference clock signal OSC is sufficiently shorter than the pulse period Tset of the start input signal SET. Incidentally, when a sampling period for sensing requires a high degree of accuracy, it is necessary simply to increase the accuracy of the pulse period Tset of the start input signal SET.

As described above, the start pulse signal generation circuit 102B configured as described above, despite having a simple configuration, can arbitrarily change the pulse period T1 of the start pulse signal SIG (and hence the first period T1 of the power-supply ON signal POW) by adjusting the pulse period Tset of the start input signal SET.

For generation of the start input signal SET, there is no need to control the duty ratio of pulse; it is necessary simply to set a desired pulse period Tset. This facilitates set design.

Alternatively, as shown in FIG. 17B, the configuration may be modified as follows. The oscillator 101 is made to oscillate upon receipt of the start input signal SET, and a timer circuit 108 is made to prevent the reference clock signal OSC from being transmitted until oscillation is stabilized, so that the sensor circuit is made to start operating after a predetermined time has elapsed. With this configuration, it is possible to stop the oscillator 101. This makes it possible to achieve a further reduction in the electric power consumption. Alternatively, as shown in FIG. 17C, the reference clock signal OSC may be inputted from outside. This eliminates the need to provide the oscillator 101, making it possible to achieve a further reduction in the electric power consumption. The configuration is not limited to those specifically shown in the figures, but may be otherwise as long as the same advantages are obtained.

The descriptions heretofore deal with the configuration of the fifth embodiment based on the fourth embodiment. This, however, is not meant to limit the application of the present embodiment in any way; the present embodiment finds wide application in various kinds of sensor circuits, including but not limited to the magnetic sensor circuit of the first embodiment.

Figure 19:
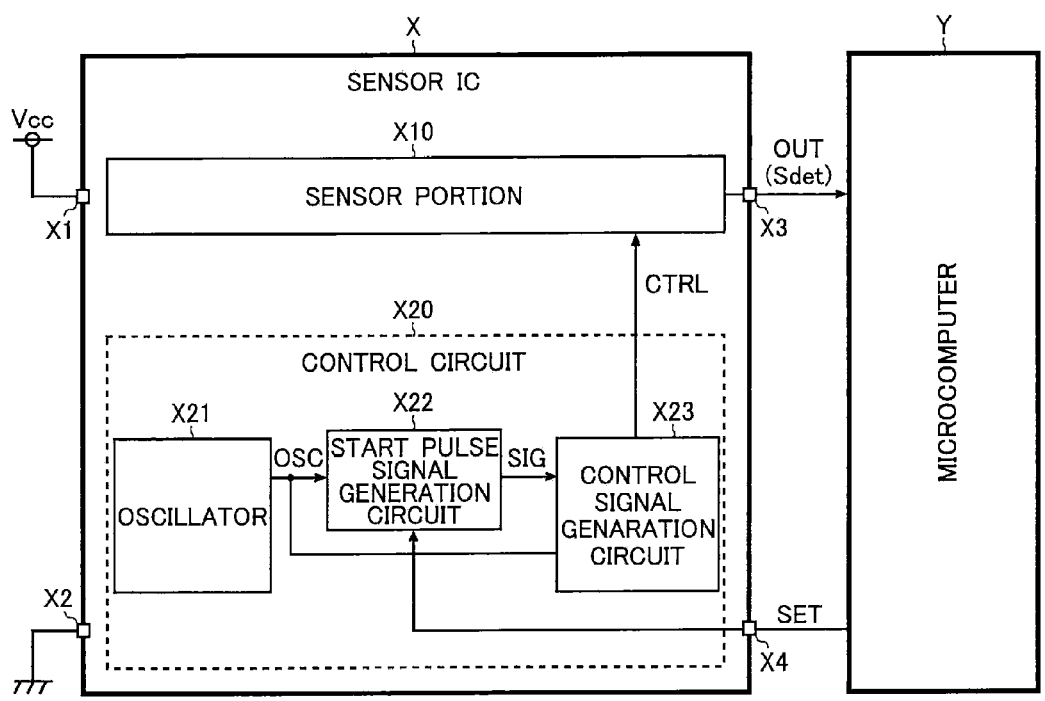
FIG. 19 is a diagram showing an example of the configuration of an electronic apparatus incorporating a sensor IC according to the invention.

FIG. 19 is a diagram showing an example of the configuration of a sensor IC built with sensor circuits of the invention integrated thereinto and an electronic apparatus (for example, a cellular phone terminal) incorporating such a sensor IC.

As shown in this figure, the electronic apparatus according to the invention includes a sensor IC X and a microcomputer Y that can change a pulse period Tset of a start input signal SET according to an output signal OUT (or a detection signal Sdet) of the sensor IC X. This electronic apparatus is so configured as to appropriately perform feedback control of a measurement mode (in other words, a trade-off between an increase in the sampling number and a reduction in current consumption) of the sensor IC X according to an output state (detection state) thereof. Though not illustrated, it is assumed that the sensor IC X and the microcomputer Y are both driven by a battery power supply.

The sensor IC X is built with a sensor circuit that is integrated thereinto and composed of: a sensor portion X10 that obtains, as an electrical signal, information (such as magnetic field, temperature, and amount of light) on an object to be measured or detected; and a control circuit X20 that controls the operation of the sensor portion X10. The sensor IC X is a small semiconductor device including, as its external terminals, only a power supply terminal X1 to which the power supply voltage Vcc is applied, a ground terminal X2 to which the ground voltage GND is applied, an output terminal X3 from which the output signal OUT of the sensor portion X10 is extracted, and a set terminal X4 to which the start input signal SET is inputted. Alternatively, the sensor portion X10 and the control circuit X20 may be formed on separate chips.

The control circuit X20 described above includes: an oscillator X21 that generates a predetermined reference clock signal OSC; a start pulse signal generation circuit X22 that receives the reference clock signal OSC and a start input signal SET having any pulse period Tset and that generates a start pulse signal SIG having a pulse period T1 commensurate with the start input signal SET by detecting the rising edge (or falling edge) of the start input signal SET by using the reference clock signal OSC; and a control signal generation circuit X23 that generates, based on the reference clock signal OSC and the start pulse signal SIG, a control signal CTRL for making the sensor portion X10 operate intermittently only for a predetermined duration at intervals of a pulse period T1 of the start pulse signal SIG. The configuration and operation of the start pulse signal generation circuit X22 are the same as those of the start pulse signal generation circuit 102B (see FIGS. 17A, 17B, and 17C), and therefore overlapping descriptions will not be repeated.

As described above, with the sensor IC X that generates the start pulse signal SIG and the control signal CTRL by using the reference clock signal OSC generated by the oscillator X21 integrated thereinto, it is necessary simply to add the set terminal X4. This helps reduce the number of external terminals, and makes lighter and thinner an electronic apparatus that can reduce the current consumption. Needless to say, intermittent operation control may be performed in such a way that the sensor portion X10 is made to operate intermittently based on a stop signal and a return signal externally inputted from the microcomputer Y. However, with the configurations shown in FIGS. 17A, 17B, and 17C, it is possible to reduce the number of pins.

Next, with reference to FIG. 20, intermittent operation control (control of a pulse period of the start input signal SET) of the sensor IC X performed by the microcomputer Y will be described in detail.

Figure 20:
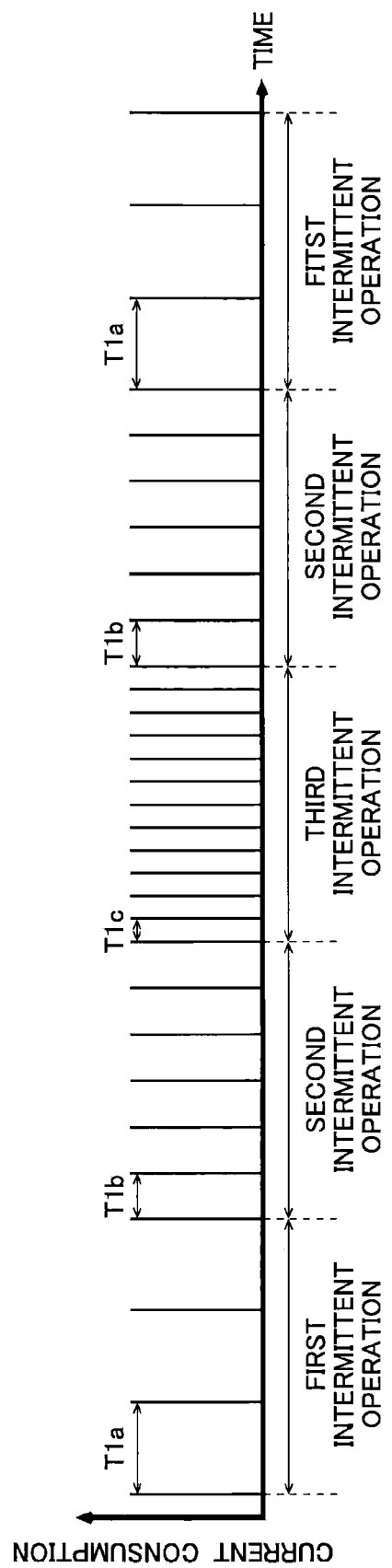
FIG. 20 is a diagram illustrating intermittent operation control (control of a pulse period of a start input signal SET) of a sensor IC X performed by a microcomputer Y.

FIG. 20 is a diagram illustrating the intermittent operation control (the control of a pulse period of a start input signal SET) of the sensor IC X performed by the microcomputer Y. In this figure, the horizontal axis represents time, and the vertical axis represents the current consumption.

FIG. 20 shows, as an example of the intermittent operation control of the sensor IC X performed by the microcomputer Y, how the measurement mode of the sensor IC X is changed from a first intermittent operation (power saving mode) to a second intermittent operation (normal sampling mode) and is then changed to a third intermittent operation (intensive sampling mode), followed by a sequential return to the second intermittent operation and to the first intermittent operation.

As shown in FIG. 20, sensing periods T1$a$, T1$b$, and T1$c$ respectively set for the first, second, and third intermittent operations are assumed to satisfy T1$a$>T1$b$>T1$c$.

In the first intermittent operation, although sensing points per unit time are small in number because of a long sensing period T1$a$, it is possible to minimize the average current consumption. On the other hand, when the measurement mode is changed from the first intermittent operation to the second intermittent operation, the sensing period T1$b$ that is shorter than the sensing period T1$a$ is set; when the measurement mode is then changed to the third intermittent operation, the sensing period T1$c$ that is shorter than the sensing period T1$b$ is set. This helps increase the number of sensing points per unit time, making it possible to prevent a reduction in the accuracy of sensing. In this case, however, the average current consumption per unit time is increased.

For example, consider a case in which the sensor IC X is applied to an application (such as sensors for detecting a turning of a dial) where a change in the polarity (S and N) of a magnetic field is detected for sensing a position of an object. In this case, since the sensor IC X consumes a significant amount of current during sensing, a sensing period has to be set to be rather long for the duration of time that no operation is accepted, so as to minimize the average current consumption. Once an operation is accepted, however, a sensing period has to be set to be short so as to minutely detect the operations that follow.

Therefore, based on the output signal OUT (or the detection signal Sdet) from the sensor portion X10, the microcomputer Y monitors whether or not an operation is carried out. When an operation is found to be carried out during the first intermittent operation, the microcomputer Y shortens the pulse period Tset of the start input signal SET so as to shift the measurement mode of the sensor IC X from the first intermittent operation to the second intermittent operation. When the microcomputer Y finds that, based on a change in the logic of the output signal OUT obtained during the second intermittent operation, there is a possibility of a reduction in the accuracy of sensing (for example, when there occurs a logic change that does not coincide with the previously determined logic change pattern of the output signal OUT), or finds that the operation is continuously performed for a predetermined duration, the microcomputer Y further shortens the pulse period Tset of the start input signal SET so as to shift the measurement mode of the sensor IC X from the second intermittent operation to the third intermittent operation.

On the other hand, based on the output signal OUT from the sensor portion X10, when the microcomputer Y finds that no operation is accepted for a predetermined duration during the third intermittent operation, the microcomputer Y sets the pulse period Tset of the start input signal SET to be longer so as to shift the measurement mode of the sensor IC X from the third intermittent operation to the second intermittent operation. Likewise, when the microcomputer Y finds that no operation is accepted for a predetermined duration during the second intermittent operation, the microcomputer Y sets the pulse period Tset of the start input signal SET to be further longer so as to shift the measurement mode of the sensor IC X from the second intermittent operation to the first intermittent operation.

That is, with the above-described intermittent operation control of the sensor IC X performed by the microcomputer Y, it is possible to perform stepwise control of the sensing period according to the presence or absence of operation and the speed of operation. This makes it possible to optimize a trade-off between an increase in the sampling number of the sensor circuit and a reduction in current consumption.

Alternatively, consider a case in which the sensor IC X is applied to an application (such as overheating protection sensors) where an increase in the temperature of an apparatus is detected for sensing abnormalities. In this case, the microcomputer Y may be configured as follows. Based on the output signal OUT (or the detection signal Sdet) from the sensor portion X10, the microcomputer Y monitors the temperature of the apparatus or an increase in that temperature. When the microcomputer Y finds an abnormal rise in the temperature or a possibility thereof (for example, finds that the temperature has risen above a threshold value based on the difference between the last and current detected temperatures, or finds that the detected temperature has reached a predetermined threshold value), the microcomputer Y shortens the pulse period Tset of the start input signal SET. Additionally, when the detection result exceeds a certain limit, the microcomputer Y stops the system.

It is to be noted that Patent Document 3 is directed to an operation by which an intermittent operation period is controlled at the initiative of a control portion irrespective of a movement of an object. By contrast, the present invention is directed to an operation by which a movement of an object is detected so as to control an intermittent operation period.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A sensor circuit comprising:
    a sensor portion arranged to obtain, as an electrical signal, information regarding an object to be measured or detected; and
    a control circuit arranged to control an operation of the sensor portion,
    wherein the control circuit is arranged to receive a start input signal inputted thereto from outside for making the sensor portion operate only for a given duration after the start input signal is inputted thereto, and
    wherein the sensor portion includes:
        a magnetoelectric conversion element arranged to produce, at a first terminal pair or a second terminal pair thereof, an output voltage commensurate with magnetism applied thereto;
        a switching circuit arranged to switch between a first switching state, in which a power supply voltage is applied to the first terminal pair and an output voltage appearing at the second terminal pair is outputted between a first output node and a second output node, and a second switching state, in which the power supply voltage is applied to the second terminal pair and an output voltage appearing at the first terminal pair is outputted between the first output node and the second output node;
        an amplifying unit arranged to output, to a first amplification output node, a first amplified voltage obtained by amplifying a first input voltage at the first output node, the first input voltage being inputted to a first amplification input node, by a predetermined amplification factor, the amplifying unit further arranged to output, to a second amplification output node, a second amplified voltage obtained by amplifying a second input voltage at the second output node, the second input voltage being inputted to a second amplification input node, by the predetermined amplification factor;
        a comparing unit arranged to compare a first comparison voltage inputted to a first comparison input node with a second comparison voltage inputted to a second comparison input node, the comparing unit further arranged to produce a comparison output when the first comparison voltage is higher than the second comparison voltage;
        a first capacitor between the first amplification output node and the first comparison input node;
        a second capacitor between the second amplification output node and the second comparison input node;
        a first switch circuit arranged to apply a first reference voltage to the first comparison input node in the first switching state;
        a second switch circuit arranged to apply a second reference voltage to the second comparison input node in the first switching state; and
        a latch circuit arranged to latch the comparison output from the comparing unit and to output an output signal of the sensor portion.

2. The sensor circuit of claim 1, wherein the control circuit includes:
    an oscillator arranged to generate a predetermined reference clock signal;
    a start pulse signal generation circuit arranged to receive the reference clock signal and the start input signal having a given pulse period, and to generate a start pulse signal having a pulse period commensurate with the start input signal by detecting a rising or falling edge of the start input signal by using the reference clock signal; and
    a control signal generation circuit arranged to generate, based on the reference clock signal and the start pulse signal, a control signal for making the sensor portion operate intermittently only for a predetermined duration at intervals of a pulse period of the start pulse signal.

3. The sensor circuit of claim 2, wherein the oscillator is arranged to start oscillating after receiving the start input signal and to make the sensor circuit operate after a predetermined time has elapsed.

4. The sensor circuit of claim 1, wherein
    the control circuit is arranged to make the sensor portion operate intermittently by performing control such that the power supply voltage is supplied to at least one of the amplifying unit and the comparing unit only for a predetermined duration at intervals of a pulse period of the start pulse signal.

* * * * *